United States Patent
Krishnamurthy et al.

(10) Patent No.: US 6,609,002 B1
(45) Date of Patent: Aug. 19, 2003

(54) METHOD AND APPARATUS FOR PREDICTIVE QOS ROUTING FOR BROAD BAND LOW EARTH SATELLITE NETWORKS

(75) Inventors: Srikanth V. Krishnamurthy, Riverside, CA (US); Ozgur Ercetin, College Park, MD (US); Son Dao, Northridge, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/541,740

(22) Filed: Apr. 3, 2000

Related U.S. Application Data

(60) Provisional application No. 60/153,931, filed on Sep. 15, 1999.

(51) Int. Cl.[7] ................................................. H04Q 7/20
(52) U.S. Cl. ...................... 455/428; 455/436; 455/452; 455/12.1; 455/13.1
(58) Field of Search .................................. 455/445, 446, 455/427, 428, 429, 452, 12.1, 13.1, 436, 440, 450; 370/316, 323, 325, 422

(56) References Cited

U.S. PATENT DOCUMENTS

| | | | | |
|---|---|---|---|---|
| 6,072,774 A | * | 6/2000 | Natarajan et al. | 370/231 |
| 6,108,538 A | * | 8/2000 | Blasiak et al. | 455/428 |
| 6,195,553 B1 | * | 2/2001 | Claffery et al. | 455/445 |
| 6,404,769 B1 | * | 6/2002 | Kapoor | 370/398 |

OTHER PUBLICATIONS

H. Uzunalioglu, W. Yen, and I.F. Akyildiz, "A Connection Handover Protocol for LEO Satellite ATM Networks", Proc. of ACM mobicom '97, Budapest, Hungary, Sep. 97.
K.Y. Eng, M.J. Karol, M. Veeraraghavan,E. Ayanoglu, C.B. Woodworth, P. Pancha, and R.A. Valenzuela, "A wireless broadband ad–hoc ATM local–area network", Wireless Networks 1 (1995) 161–174.

(List continued on next page.)

*Primary Examiner*—Lester G. Kincaid
*Assistant Examiner*—Ronald J. Ward
(74) *Attorney, Agent, or Firm*—Tobe-McKay & Associates

(57) ABSTRACT

A predictive routing scheme for broad band Low Earth Orbit (LEO) satellite constellations is presented. The predictive routing scheme may be used to provide Quality of Service (QoS) guarantees for both Constant Bit-Rate (CBR) and Variable Bit-Rate (VBR) traffic types. The predictive routing scheme takes advantage of the predictable qualities of a LEO constellation, such as constant satellite footprint, constant satellite velocity, and predictable satellite trajectory. By using this information, combined with satellite-fixed cells which are divided into a set of equal-sized slots, along with user information such as the location of each particular user as well as the geographic concentrations of user traffic, each satellite may cooperate with surrounding satellites which have recently passed through the area into which they are entering, in order to receive predictive information regarding their future load. The information for each of the individual satellites may be used in order to determine a set of possible routes for new calls based on the predictive information regarding the future load distribution on the network. The predictive routing scheme utilizes a cost function in order to determine an optimal set of routes that maximizes the amount of unused bandwidth of the network, while still providing the required QoS guarantees.

12 Claims, 13 Drawing Sheets

OTHER PUBLICATIONS

S. Shenker, C. Partridge, and R. Guerin, "Specification of Guaranteed Quality of Service", RFC 2212.

M. A. Sturza, "Architecture of the TELEDESIC Satellite System", Proceedings of International Mobile Satellite Conference, pp. 212–218, 1995.

F. Dosiere, T. Zein, G. Maral, and J.P. Boutes, "A Model for the Handover Traffic in Low–Earth Orbiting (LEO) Satellite Networks for Personal Communications", International Journal of Satellite Communications, 11:145–149, 1993.

E. Del Re, R. Fanatacci, and G. Giambene, "Handover Requests Queuing in Low Earth Orbit Mobile Satellite Systems", Proceedings of the 2nd European Workshop on Mobile/Personal Satcoms, pp. 213–232, 1996.

M. Werner, C. Delucchi, H. J. Vogel, G. Maral, and J. J. De Ridder, "ATM–Based Routing in LEO/MEO Satellite Networks with Intersatellite Links", IEEE Journal on Selected Areas in Communications, 15(1):69–82, Jan. 1997.

B. A. Akyol and D. C. Cox, "Rerouting for Handoff in a Wireless ATM Networks", IEEE Personal Communications, 3(5):26–33, Oct. 1996.

J. F. P. Labourdette and A. S. Acampora, "Logically Rearrangable Multihop Lightwave Networks", IEEE Transactions Communications, vol. 39, No. 8, pp. 1223–1230, Aug. 1991.

* cited by examiner

| Source user address: cell location and slot number | Destination user address: cell location and slot number | Flow id | Timestamp: Time the packet was created |
|---|---|---|---|

Packet header for PRP protocol

FIG. 8

METHOD AND APPARATUS FOR PREDICTIVE QOS ROUTING FOR BROAD BAND LOW EARTH SATELLITE NETWORKS

This application claims the benefit of provisional application Ser. No. 60/153,931 filed Sep. 15, 1999.

TECHNICAL FIELD

The present invention relates to wireless communication networks. More particularly, the present invention relates to the provision of an effective routing scheme incorporating Low Earth Orbit (LEO) satellites to provide a reliable broadband communication network.

BACKGROUND

Terrestrial wireless networks such as cellular and personal communication system (PCS) networks are currently used to provide mobile communications services, and have limited geographic coverage. Low Earth Orbit (LEO) satellite networks can be used to augment these terrestrial wireless networks in order to provide global broadband services to users regardless of the users' geographical locations. Because of the low altitude of LEO satellites, the round trip propagation delay for communication between an Earth-based terminal and a LEO satellite is comparable to the round trip communication time in terrestrial networks. Thus, real-time communications services can be delivered to users in diverse geographic locations. A LEO is defined as any earth orbit of up to approximately 1,500 kilometers in altitude. At this altitude, satellites typically orbit the earth in periods of approximately 100 to 120 minutes. For reference, examples of several classes of earth orbits, including LEOs, medium earth orbits, and geosynchronous earth orbits are shown as elements 100, 102, and 104, respectively, in FIG. 1. With regard to LEO satellites, low elevation angles result in attenuation and terrain shadowing effects that place limits on reliable communication. Thus, LEO satellites must rely on high elevation angles for successful communication, resulting in a relatively small satellite footprint for each satellite. Thus, in order to provide continuous and seamless services to users regardless of where a particular user is located, LEO satellite networks must include satellite constellations with tens of satellites. Additionally, the satellites must be equipped with capabilities such as on-board processing and inter-satellite communication links in order to provide a framework for robust and efficient communications.

LEO satellite systems currently under various phases of deployment maintain either Earth-fixed cells or they maintain satellite-fixed cells. Earth-fixed cells are stationary cells on the Earth that are dynamically served by LEO satellites cycling in and out of range of the cell. Satellite-fixed cells are dynamic cells formed from moving satellite footprints on the Earth, wherein the affiliation of as stationary individual user changes from cell to cell over time. A pictorial representation of two LEO satellites 200 is depicted in FIG. 2 with satellite-fixed cells 202. Issues involved with Earth-fixed cells, are similar to those involved in building terrestrial cellular networks.

In satellite networks with Earth-fixed cells, the mobility of terrestrial users causes a need for communication handovers, wherein a communication link is handed from one cell to another. In contrast, in satellite-fixed cells, the mobility of the satellites causes the need for communication handovers. Furthermore, in LEO satellite systems with satellite-fixed cells, the number of users in a cell and the traffic served by each satellite change over time. A user typically may be handed from one satellite to another multiple times over the duration of a single connection. The inherent mobility of the satellites may cause problems in maintaining user connections. For example, an ongoing connection may be dropped during handoff because of the lack of an available user-to-satellite uplink/downlink channel. If a particular connection has strict Quality of Service (QoS) requirements such as delay or delay jitter bounds, it may be blocked, even if user-to-satellite channels are available, due to the lack of a route with adequate resources between the satellite ingress and egress points.

The provisioning of guaranteed service relies on the reservation of a specific amount of bandwidth for a connection on the links connecting the communicating end-users. For example, in terrestrial broadband networks, a route for a particular connection requiring dedicated bandwidth, between two end-users is determined based on available bandwidth on various network links at the time of call set-up. Typically, when guaranteed services are offered, a particular route is used for the entire call duration. In LEO satellite networks, the traffic on the inter-satellite links (ISLs) changes with changes in the user-to-satellite traffic (which in turn changes due to the mobility of the satellites). Hence, traditional terrestrial routing methods cannot be applied to broadband LEO satellite networks. Although sufficient bandwidth may be available on a particular route at the time of call set-up for a particular call, the same route may become congested in time due to the changes in access traffic loads, which, in turn, change due to the mobility of the satellites.

Summarizing, delivering quality of service (QoS) guarantees to the users of LEO satellite networks is complicated, since footprints of LEO satellites move as the satellites traverse their orbits, thus causing frequent user handovers between satellites. Traffic on inter-satellite links of a particular satellite are subjected to changes as the user traffic served by the satellite changes with the satellite's mobility. The change in user traffic on the inter-satellite links may cause violation of the QoS guarantees made to on-going calls.

As the traffic types increase to include real-time voice and video, it becomes essential to provide strict QoS bounds. Routing methods presently deployed in LEO satellite networks are based on Internet protocol (IP) routing, and cannot provide strict QoS bounds. Generally, these methods are negligent in taking into account the geographical distribution of the user traffic, and may result in the blocking of ongoing calls during handover attempts. Channel partitioning and bandwidth reservation schemes used for terrestrial cellular systems may be used to avoid handover call blocking at the expense of underutilization of channel bandwidth.

A major focus in LEO satellite network research has been toward the provision of successful signal handover to users of satellite-fixed cells as they transition from the coverage area of one satellite to the coverage area of another. This issue has been addressed, taking into account the fact that the same or different satellites may cover different users at different times. Research has also focused on setting up routes between pairs of satellites to minimize the re-routing frequency due to handovers, taking into account the fact that, often, due to satellite movement, a user pair might not be serviced by the same satellite end nodes for the complete call duration. However, an optimal route between two satellite nodes is not necessarily optimal for a connection between two ground terminals, since the handovers between the ground terminals and the satellites result in changing satellite end nodes for the connection.

The handover rerouting problem has been addressed in the context of terrestrial wireless networks, wherein the cells and the base stations serving those cells are stationary. The handover rerouting problem in this case arises due to the mobility of the end-users rather than that of the base stations. One proposed solution to the handover rerouting problem in terrestrial networks was to determine a whole new route after a handover. This solution, though optimal for a particular connection, causes excessive signaling in the network, resulting in a degradation of network throughput. Partial rerouting schemes have been proposed, wherein choosing a non-optimal path for the connection reduces the processing and messaging overhead in the network. Furthermore, it has been proposed that a new path for a connection during a handover be found by using as much of the original path used by the connection as possible. However, the resulting path connection found from source to destination is non-optimal.

Therefore, there is a need for a method for routing with guaranteed quality of service in a LEO satellite network which effectively handles handover rerouting.

A large amount of background information exists regarding satellite networks, including details of satellite network models such as the fluid model as well as means for implementing satellite network models, see e.g.:

A. Jamalipour, *Low Earth Orbital Satellites for Personal Communication Networks,* Artech House, Inc, 1998;

M. A. Sturza. "Architecture of the TELEDESIC Satellite System," *Proceedings of International Mobile Satellite Conference,* p.p. 212–218, 1995;

F. Dosiere, T. Zein, G. Maral, and J. P. Boutes. "A Model for the Handover Traffic in Low-Earth Orbiting (LEO) Satellite Networks for Personal Communications," *International Journal of Satellite Communications,* 11: 145–149, 1993;

E. Del Re, R. Fantacci, and G. Giambene. "Handover Requests Queuing in Low Earth Orbit Mobile Satellite Systems," *Proceedings of the 2$^{nd}$ European Workshop on Mobile/Personal Satcoms,* p.p. 213–232, 1996;

M. Werner, C. Delucchi, H.-J. Vogel, G. Maral, and J.-J. De Ridder. "ATM-Based Routing in LEO/MEO Satellite Networks with Intersatellite Links," *IEEE Journal on Selected Areas in Communications,* 15(1):69–82, January 1997;

B. A. Akyol and D. C. Cox. "Rerouting for Handoff in a Wireless ATM Networks," *IEEE Personal Communications,* 3(5):26–33, October 1996;

K. Y. Eng et al. "A Wireless Broadband Ad-Hoc ATM Local Area Network," *Wireless Networks,* 1(2):161–174, 1995;

J. F. P. Labourdette and A. S. Acampora, "Logically Rearrangable Multihop Lightwave Networks," *IEEE Transactions Communications,* vol.39, no. 8, pp.1223–1230, August 1991;

H. Uzunalioglu, W. Yen, and I. F. Akyildiz, "A Connection Handover Protocol for LEO Satellite ATM Networks". *Proc. of ACM Mobicom '97,* Budapest, Hungary, September 97;

S. Shenker, C. Partridge and R. Guerin, "Specification of Guaranteed Quality of Service," *RFC* 2212;

VINT Network Simulator (ns), version 2.0. University of California, Berkeley, Lawrence Berkeley National Laboratories, 1998, http:://mash.cs.berkeley.edu/ns/ns.html;

D. P. Connors, B. Ryu, and S. K. Dao, "Modeling and Simulation of Broadband Satellite Networks Part I: Medium Access Control for QoS Provisioning," *IEEE Communications Magazine,* March 99;

P. Ferguson and G. Huston, "Quality of Service: Delivering QoS on the Internet and in Corporate Networks," Chap. 7, John Wiley & Sons, Inc. 1998; and T. Le-Ngoc and S. V. Krishnamurthy, "Performance of Combined Free/Demand Assignment Multiple-Access Schemes in Satellite Communications," *Int'l. Journal of Satellite Communication,* Vol. 14, pp. 11–21 1996.

SUMMARY OF THE INVENTION

It is an object of the present invention to overcome the limitations discussed above, and to provide a method and apparatus for enabling predictive QoS routing of calls within a satellite network, with the method including the steps of:

a. providing a satellite constellation orbiting the earth, said satellite constellation including at least one orbit, with each one of the at least one orbit including a plurality S of satellites, each indexed by a number s, and communicatively connected by a plurality of communication links, with each particular satellite having a satellite-fixed cell divided, perpendicularly with respect to the orbit of the particular satellite, into a plurality L of satellite-fixed, cell slots, with the movement of the plurality S of satellites over the earth being characterized in that the satellite-fixed cell for a satellite indexed at s covers the same area as the satellite-fixed cell of a satellite indexed at s+1 after passing over an area on the earth equivalent to the area of L satellite-fixed cell slots, and with an offset satellite-fixed cell being defined each time the satellite-fixed cell covers the area of one of L satellite-fixed cell slots while moving between the position of the satellite-fixed cell corresponding to a satellite indexed s and the satellite-fixed cell corresponding to a satellite indexed s+1, providing L offset satellite-fixed cells with the L offset satellite-fixed cells for each particular satellite being indexed by a number l=1, . . . , L, with the satellite-fixed cells and the offset satellite-fixed cells being defined as reference satellite-fixed cells;

b. receiving a call from a source user to a destination user, the call having a particular QoS requirement;

c. acquiring information regarding the source user and the destination user, including a user address and user location;

d. determining the satellite, the satellite-fixed cell, and the satellite-fixed cell slot within the satellite-fixed cell in which the source user is located, said satellite being defined as the source user end-reference satellite;

e. determining the satellite, the satellite-fixed cell, and the satellite-fixed cell slot within the satellite-fixed cell in which the destination user is located, said satellite being defined as the destination user end-reference satellite;

f. determining all paths including, at most, a preset number J of inter-satellite hops, between the source user end-reference satellite and the destination end-user reference satellite;

g. calculating a minimum residual link capacity for each of the plurality of paths determined in step (f);

h. determining, for each offset satellite-fixed cell l=1, . . . , L, a set $\{k_l\}$ of paths that maximize the residual bandwidth at that offset satellite-fixed cell;

i. picking, from each set $\{k_l\}$ of paths determined for each offset satellite-fixed cell, one path p such that the combined set CS of paths for all of the offset satellite-fixed cells minimizes the number of communication link changes necessary to maintain a call between the source user and the end user as the satellites move in their orbits; and j. reserving at each offset satellite-fixed cell, the bandwidth along the path picked in step i, corresponding to the particular QoS requirement of the call.

The calculation of the minimum residual link capacity for each of the plurality of paths at a given offset satellite-fixed cell l may be further defined by $r_p(l)=c_i(l)-R_p$, where $c_i(l)$ is the current link capacity of link i at offset satellite-fixed cell l, and where $R_p$ represents the bandwidth required for a new call on path p if the connection is admitted in the offset satellite-fixed cell l, and where $$R_p = \frac{(b+C_{tot})}{(D_{req}-d(p))},$$

where b represents the token bucket size, $C_{tot}$ represents the total rate-dependent delay experienced by a packet belonging to the call, $D_{req}$ represents the end-to-end delay requirement of each packet, and d(p) represents the end-to-end propagation delay for a chosen path p if the connection is admitted on the offset satellite-fixed cell l.

The picking of a path from each set of $\{k_l\}$ paths may be further defined as including the sub-steps of:

i. picking, for each set of paths $\{k_l\}$ for offset satellite-fixed cells l=1, ... ,L, a path, where the combined set of picked paths over all of the offset satellite-fixed cells l=1, ... ,L is defined as a combined set of picked paths $CS_m$, where m=1, ... ,$k^L$;

ii. determining the total number of link changes $H_{Sm}$ required on the combined set of picked paths CS;

iii. repeating sub-steps i and ii for each different combination of paths;

iv. determining an overall reward for each combination set $S_m=\{p_1(i_1), p_2(i_2), \ldots, p_L(i_L)\}$, where $i_1=1, \ldots, k$ is the path chosen for offset satellite-fixed cell l, by:

$$reward(S_m) = \sum_{l=1}^{L} r_p(l) - W \cdot H_{Sm},$$

where W is a constant used to weigh the relative importance of having few link changes on the route for the call as offset calls are transitioned, with respect to the balancing of the user traffic;

v. choosing the $S_m$ that maximizes the reward($S_m$); and vi. after a path for every offset satellite-fixed cell l=1, 2, ... , L has been determined for the connection, reserving the necessary bandwidth for each path to satisfy the QoS requirements along the links forming the paths.

Furthermore, an embodiment of the method of the present invention may be operated on a pre-existing satellite network or may include the provision of such a network.

The apparatus of the present invention includes:

a. means for receiving a call from a source user to a destination user;

b. means for acquiring information for the source user and the destination user, including a user address and user location;

c. means for determining the satellite, the satellite-fixed cell, and the satellite-fixed cell slot within the satellite-fixed cell in which the source user is located, said satellite being defined as the source user end-reference satellite;

d. means for determining the satellite, the satellite-fixed cell, and the satellite-fixed cell slot within the satellite-fixed cell in which the destination user is located, said satellite being defined as the destination user end-reference satellite;

e. means for determining all paths including at most a predetermined number J of inter-satellite hops, between the source user end-reference satellite and the destination end-user reference satellite;

f. means for calculating the minimum residual link capacity for each of the paths determined by the means in (e);

g. means for determining, for each offset satellite-fixed cell l=1, ... ,L, a set $\{k_l\}$ of paths that maximize the residual bandwidth at that offset satellite-fixed cell; and h. means for picking, from each set $\{k_l\}$ of paths determined for each offset satellite-fixed cell, one path p such that the combined set CS of paths for all of the offset satellite-fixed cells minimizes the number of communication link changes necessary to maintain a call between the source user and the end user.

The calculation of the minimum residual link capacity for each of the plurality of paths at a given offset satellite-fixed cell l may be further defined by $r_p(l)=c_i(l)-R_p$, where $c_i(l)$ is the current link capacity of a given link i at offset satellite-fixed cell l, and where $R_p$ represents the bandwidth required for a new call on path p if the connection is admitted in the offset satellite-fixed cell l, and where $$R_p = \frac{(b+C_{tot})}{(D_{req}-d(p))},$$

where b represents the token bucket size, $C_{tot}$ represents the total rate-dependent delay experienced by a packet belonging to the call, $D_{req}$ represents the end-to-end delay requirement of each packet, d(p) represents the end-to-end propagation delay for a chosen path p if the connection is admitted on the offset satellite-fixed cell l.

The picking of a path from each set of $\{k_l\}$ paths may be further defined by the provision of:

i. means for picking, for each set of paths $\{k_l\}$ for offset satellite-fixed cells l=1, ... , L, a path, where the combined set of picked paths over all of the offset satellite-fixed cells l=1, ... ,L is defined as a combined set of picked paths $CS_m$, where m=1, ... ,$k^L$;

ii. means for determining the total number of link changes $H_{Sm}$ required on the combined set of picked paths CS;

iii. means for operating the means of in i and ii for each different combination of paths;

iv. means for determining an overall reward for each combination set $S_m=\{P_1(i_1), p_2(i_2), \ldots, p_L(i_L)\}$, where $i_1=1, \ldots, k$ is the path chosen for offest satellite-fixed cell l, by:

$$reward(S_m) = \sum_{l=1}^{L} r_p(l) - W \cdot H_{Sm},$$

where W is a constant used to weigh the relative importance of having few link changes on the route for the call as offset calls are transitioned, with respect to the balancing of the user traffic;

v. means for choosing the $S_m$ that maximizes the reward $(S_m)$; and vi. a means for reserving the necessary bandwidth for each path to satisfy the QoS requirements along the links forming the paths, after a path for every offset satellite-fixed cell l=1, 2, . . . , L has been determined for the connection.

The apparatus of the present invention optionally includes the provision of a satellite constellation orbiting the earth, said satellite constellation including at:least one orbit, with each one of the at least one orbit including a plurality S of satellites, each indexed by a number s, and communicatively connected by a plurality of communication links, with each particular satellite having a satellite-fixed cell divided, perpendicularly with respect to the orbit of the particular satellite, into a plurality L of satellite-fixed cell slots, with the movement of the plurality S of satellites over the earth being characterized in that the satellite-fixed cell for a satellite indexed at s covers the same area as the satellite-fixed cell of a satellite indexed at s+1 after passing over an area on the earth equivalent to the area of L satellite-fixed cell slots, and with an offset satellite-fixed cell being defined each time the satellite-fixed cell covers the area of one of L satellite-fixed cell slots while moving between the position of the satellite-fixed cell corresponding to a satellite indexed s and the satellite-fixed cell corresponding to a satellite indexed s+1, providing L offset satellite-fixed cells with the L offset satellite-fixed cells for each particular satellite being indexed by a number l=1, . . . , L, with the satellite-fixed cells and the offset satellite-fixed cells being defined as reference satellite-fixed cells.

BRIEF DESCRIPTION OF THE DRAWINGS

FIG. 8 is a table showing the preferred information included in the packet headers used in conjunction with the predictive routing method of the present invention;

DETAILED DESCRIPTION

Figure 1:
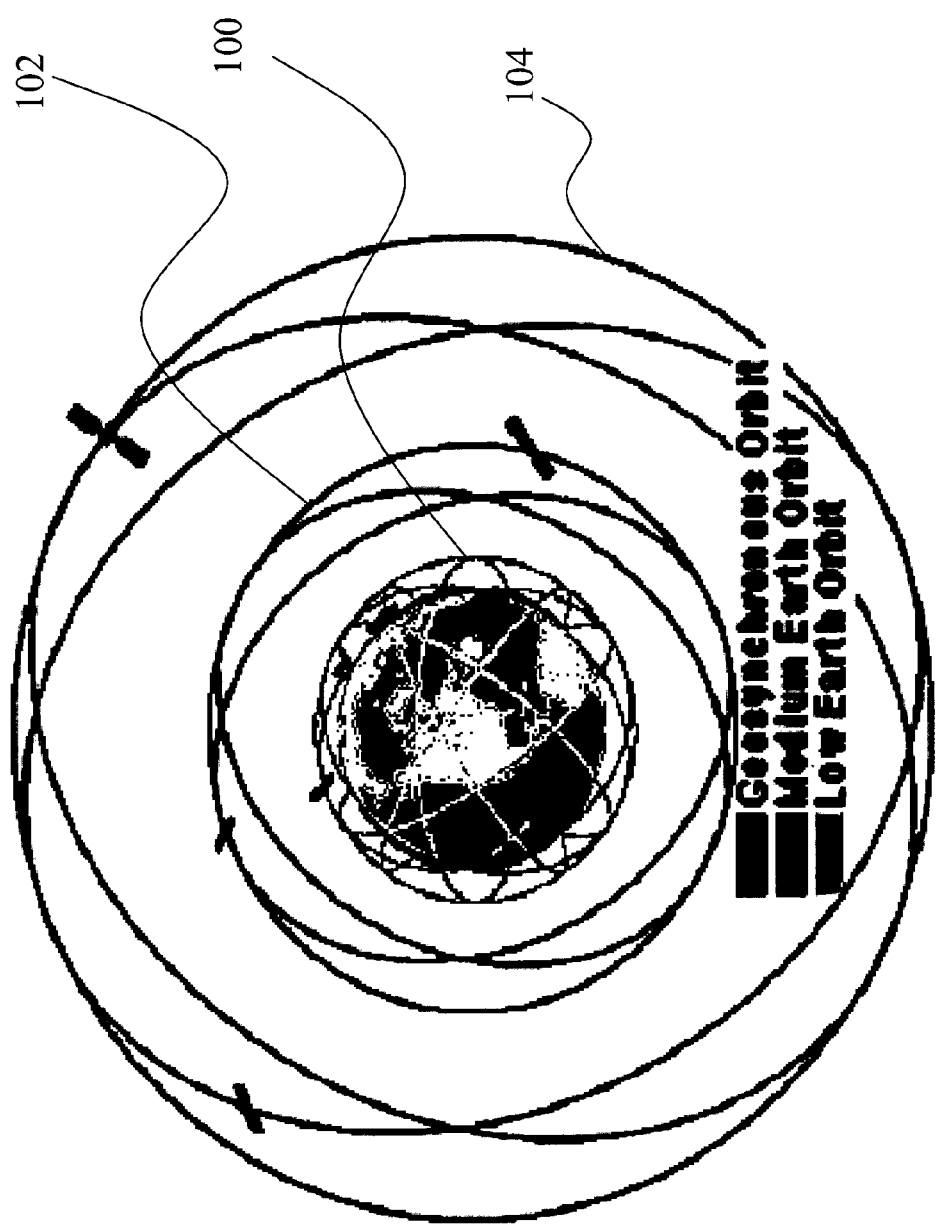
FIG. 1 is a diagram displaying several classes of earth-orbits, including Low Earth Orbits (LEO), medium earth orbits, and geosynchronous earth orbits.
Figure 2:
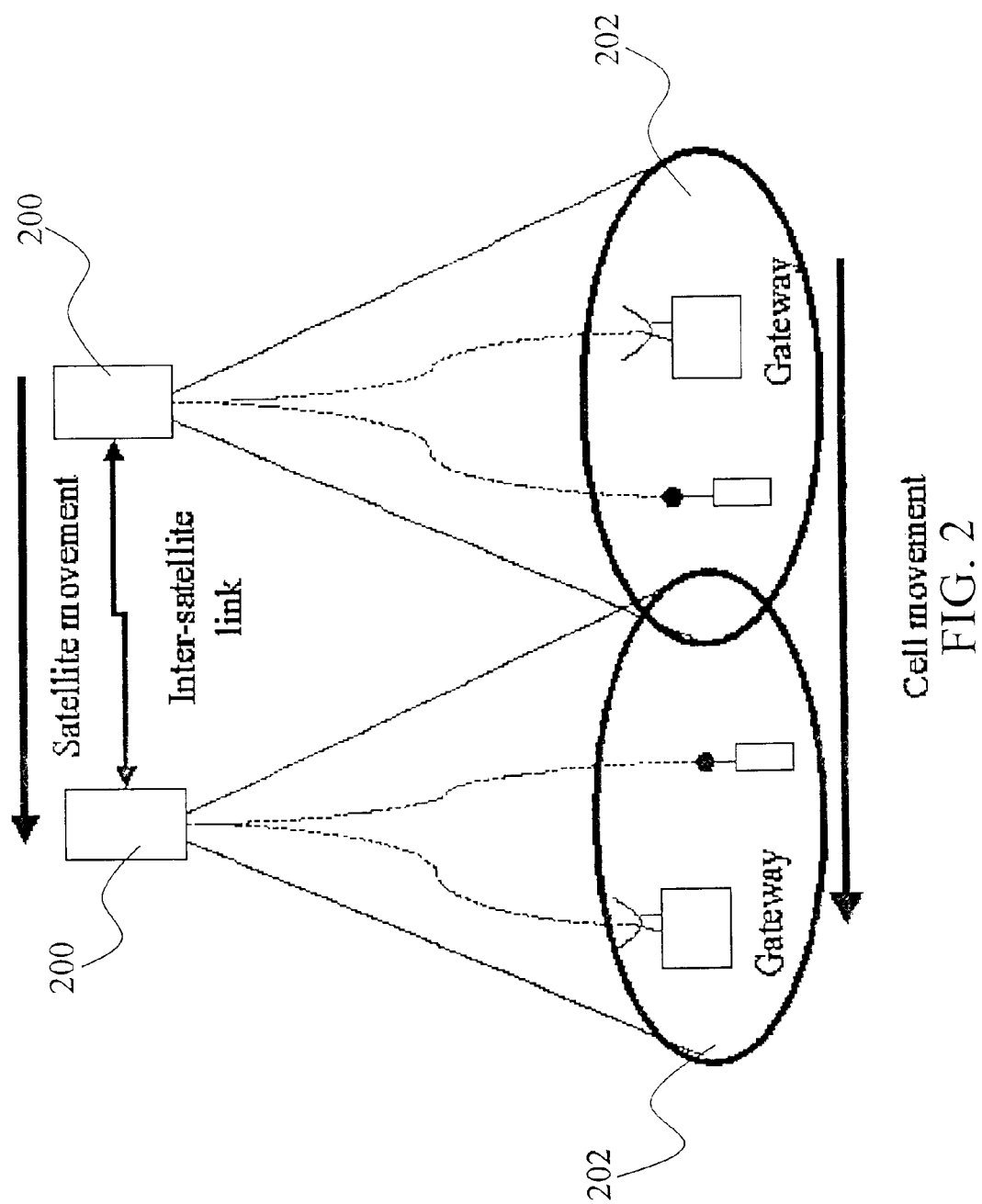
FIG. 2 is a pictorial representation of two LEO satellites with satellite-fixed cells.

The present invention relates to a predictive Quality of Service (QoS) routing method for broadband Low Earth Orbit (LEO) satellite networks that provides an efficient means for call routing within satellite constellations, as well as satellite systems incorporating it therein. The following description is presented to enable one of ordinary skill in the art to make and use the invention and to incorporate it in the context of particular applications. Various modifications to the preferred embodiment, as well as a variety of uses in different applications will be readily apparent to those skilled in the art, and the general principles defined herein may be applied to other embodiments. Thus, the present invention is not to be limited to the embodiments shown, but is to be accorded the widest scope consistent with the principles and novel features disclosed herein.

It is an object of the present invention to provide a means for providing QoS routing in LEO satellite networks with satellite-fixed cells while accounting for the effects of non-uniform user traffic. As a LEO satellite traverses its orbit, the area covered by its footprint changes. Thus, the number of calls and the traffic served by each satellite changes dynamically and non-uniformly, even if user traffic is static in time. If this non-uniformity in traffic patterns is not taken into account while computing communication routes, bottlenecks may result on the inter-satellite links of the LEO network, and thus the QoS guarantees of calls may be violated. Thus, minimizing transmission jitter is desirable in applications where a steady, continuous datastream is important such as multimedia applications with audio and video components. Provisioning deterministic QoS, primarily in terms of jitter guarantees is of particular importance.

The LEO satellite network topology has a deterministic nature, which is exploited in the design of a routing method of the present invention. Given sufficient information regarding the topology of a LEO satellite constellation along with location information regarding the end-users, such as may be obtained via such means as Global Positioning System (GPS) enabled equipment, it is possible to predict the short-term future load on each constellation-member satellite. It is possible to represent the movement of a given satellite by the use of a sliding window, the size of which determines the granularity with which the changes in the user traffic accessing the satellite may be modeled. User traffic information is utilized in determining whether the system has resources sufficient to accommodate a new call originating at a given location and requesting a particular QoS. If the requisite resources exist, the method of the present invention determines multiple possible routes for the call, which are used at different times during a call to optimize bandwidth allocation, and to avoid bottlenecks. All routing decisions are performed at call setup by exploiting the predictability of the LEO satellite topology, and thus, further processing delays during call handovers and the possibility of call blocking due to insufficient resources when a call attempt is made are considerably avoided. The routing protocol may consider a path different from the shortest path between two users, as long as the path can satisfy the requested QoS by the call. Thus, the protocol is also "intelligent" enough to reserve larger bandwidths for such a longer path, so as to compensate for the larger propagation delays encountered, and to satisfy the delay jitter bounds for both real-time sustained constant bit rate (CBR) and variable bit rate (VBR) user traffic in LEO satellite networks with satellite-fixed cells.

Figure 3:
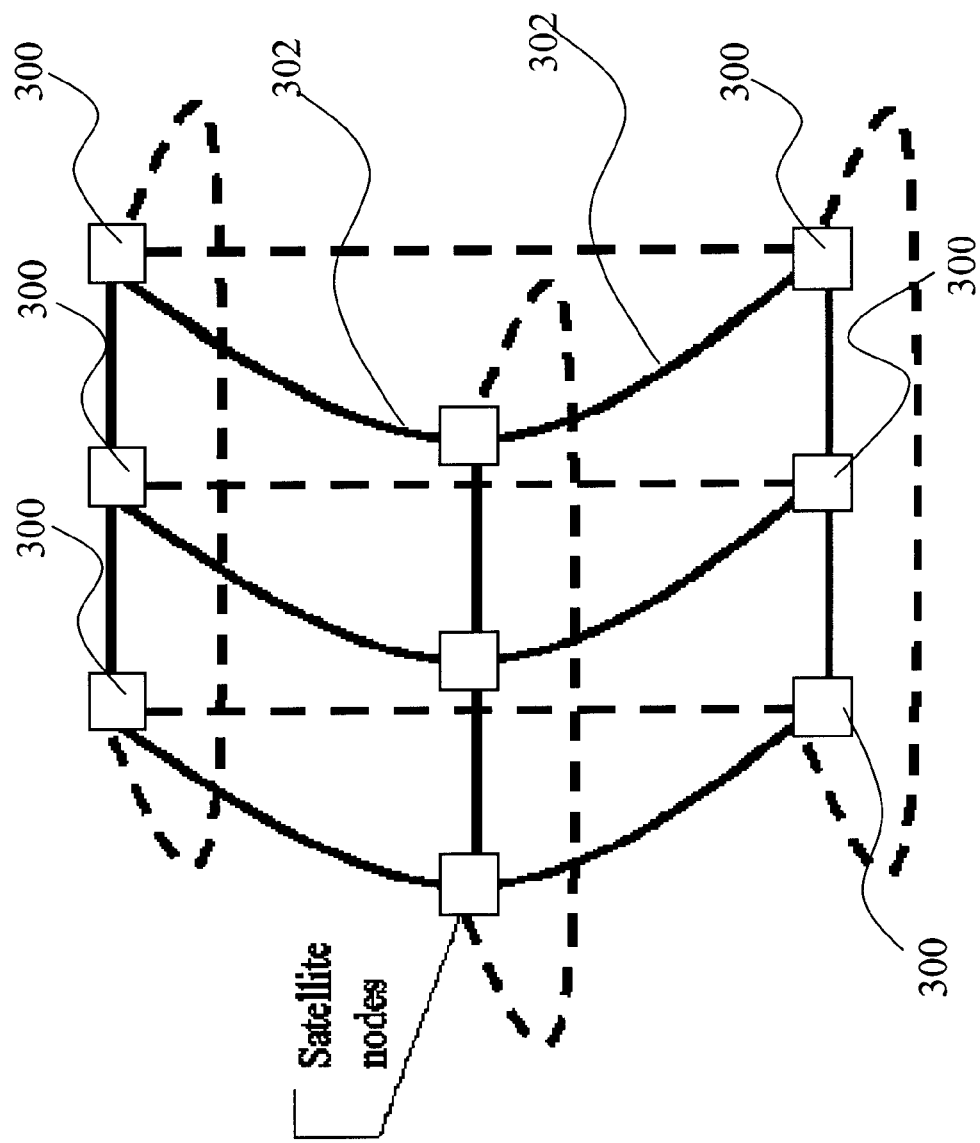
FIG. 3 is a diagram showing the toroidal mesh architecture formed by inter-satellite links between satellites having single spot beams, and non-overlapping rectangular satellite footprints.

In the LEO satellite system model, satellites move in a plurality p of circular polar orbits. In order to provide global earth coverage, each orbit has a plurality s of satellites therein. As shown in FIG. 3, each satellite has four inter-satellite links 302, which connect the satellite to its neighboring satellites both in the adjacent orbital plane and in the same orbital plane. It is assumed that the inter-satellite links are reliable and exist for the complete duration of the satellite's orbital revolution. This assumption results in a toroidal mesh architecture as depicted in FIG. 3. The satellites 300 are considered to have single spot beams, and the satellite footprints are assumed to be non-overlapping, covering a rectangular area. It is also assumed that all satellites 300 move in the same direction with constant speed. Since the earth is round, this assumption is only valid if a relatively small region is observed, as is the case with LEO satellites with high elevation angles. Given the small size of the satellite footprints and the high speed of the satellites, approximately 25,000 km/h, it is also realistic to assume that the ground terminals are stationary, as their speed relative to that of the satellites is negligible. Thus, the cause of all handovers is assumed to be the mobility of the LEO satellites, rather than by the motion of the ground terminals. In most cases, the duration of a communication connection, such as that of a phone call, is typically much less that the orbital period of a satellite, which is roughly 100 to 120 minutes. Additionally, the rotational displacement of the earth is assumed to be negligible during the lifetime of a connection. However, a single connection may be handed off from one satellite to another multiple times during the span of the connection. For tracking, users are assumed to be equipped with a location determining system such as those using the Global Positioning System (GPS).

The footprints of satellites in a particular orbit cover the same geographic area during each orbital revolution. At a given time, each satellite handles traffic from a portion of the overall coverage region of a particular orbit. The user traffic might be non-uniform with respect to both time and location. As the satellite moves along its orbit, the number of users, and thus, the amount of traffic it serves changes. This change in the amount of user traffic served by a satellite may cause blocking of some of the handover calls due to either the non-availability of the ground user-to-satellite up/down wireless links, or insufficient capacity on the inter-satellite links (ISLs) on the route connecting the end users. Typically, a Medium Access Control (MAC) layer protocol, which supports bandwidth reservations, is provided to ensure the availability of the user-to-satellite links if a path between the end-users is feasible.

Figure 4:
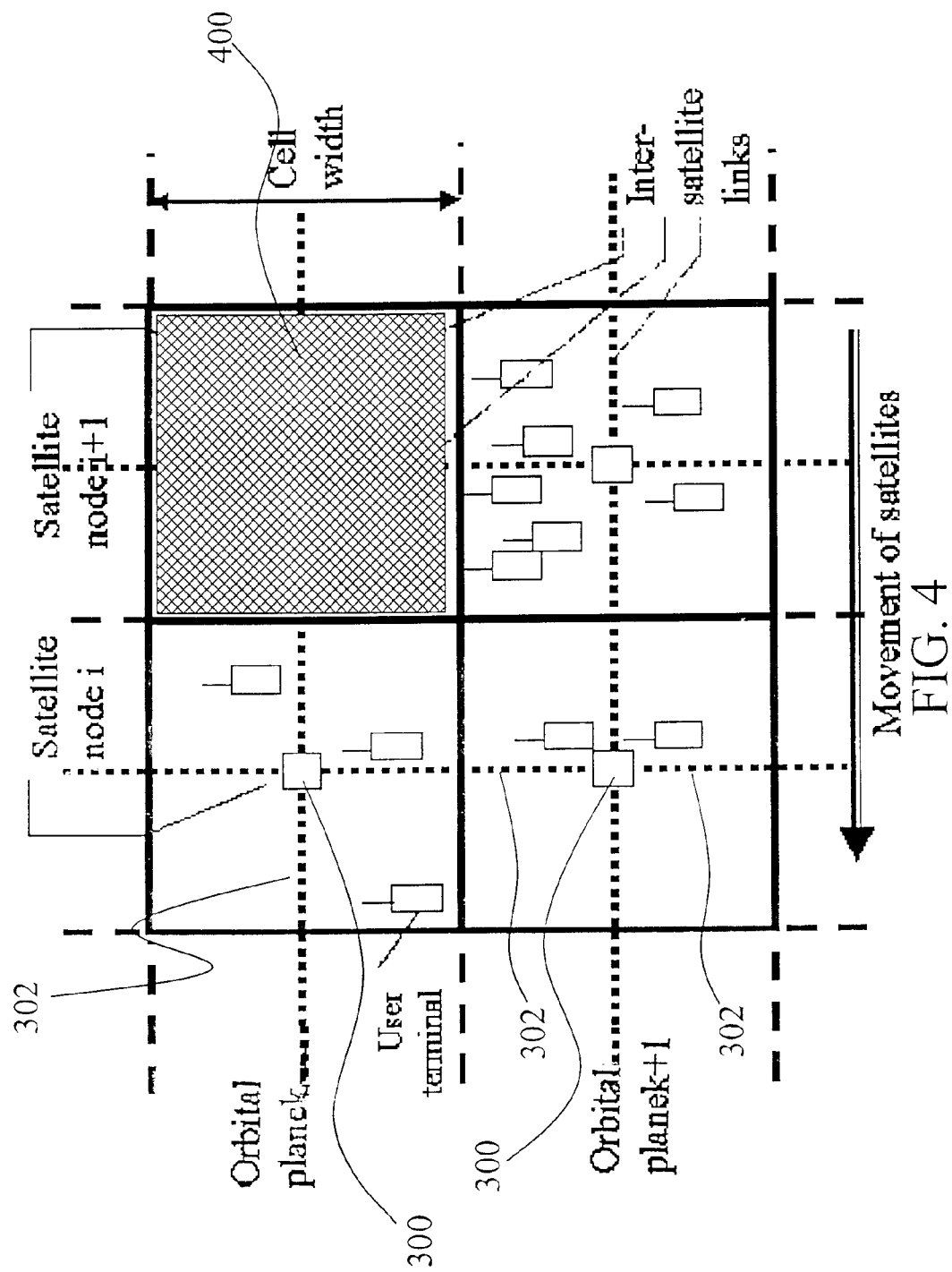
FIG. 4 is a depiction of a of the area of several satellite footprints, showing the relationship between the satellites, the satellite nodes, the orbital plane, and a plurality of users.

The change in user traffic due to satellite motion is reflected in traffic carried on the inter-satellite links. The traffic on the inter-satellite links changes even when the user traffic is static in time. It can be deduced that if the user traffic is static, the change in the traffic carried by each satellite is periodic, reflecting the motion of the satellites. If the user traffic is static with respect to time, but varies with respect to geographical location, as is the case in realistic satellite systems, the traffic load on a given satellite changes periodically. This is clearly shown in FIG. 4, which provides a representation of satellite footprints 400 and non-uniform user traffic across the terrestrial region shown. For example, let $A_i(t)$ denote the geographic area covered by the footprint 400 of a given satellite i at time t. In FIG. 4, the overlaid, patterned box represents the area of a satellite footprint 400. Assuming that the satellite orbits the earth with a period of $T_0$ time units, neglecting the Earth's rotational motion, and assuming user traffic to be static in time but varying with respect to geographical location, at time $T_0+t$, $A(T_0+t)=A(t)$. In other words, the satellite will cover the same geographic area $A_i(t)$ once each period $T_0$. Therefore, since the satellite footprint moves in a fixed manner with a fixed period, covering a fixed area $A_i(t)$, and since the user traffic is static with respect to time, but varying with respect to location, the variation in traffic seen by the satellite may considered as being due to its movement with respect to the varying concentrations of user traffic present on the Earth. Furthermore, assuming the user traffic is static with respect to time, but varying with respect to location, and that the satellite footprints are non-overlapping, the user traffic serviced by a satellite i at time t on an arbitrary orbital plane k is the same as the traffic served by the next satellite i+1 in the same orbital plane k at time $T_s+t$, where $T_s$ represents the amount of time required for a satellite to travel a distance equal to the width of its footprint. This is more readily understandable by the relationship $A_i(t)=A_{i+1}(t+T_s)$, where it is assumed, for simplicity, that footprints of satellites are rectangular, contiguous, and non-overlapping, and since user traffic is assumed static with respect to time, but varying with respect to location.

The delivery of a guaranteed QoS to users is an important aspect of the present invention. Providing a guaranteed QoS requires that the packets of a call arrive within a pre-specified guaranteed delivery time and that the packets will not be discarded due to queue overflows. Of course, this level of service is only possible provided that a call adheres to a specified traffic profile. The service is intended for applications that need deterministic guarantees that a packet will arrive no later than, or not much sooner than a certain time at its destination. The user traffic conforms to a token bucket with bucket size b, and a token rate r. A user call will request bandwidth R on the links on the path connecting the end-users. The definition of guaranteed service requires that the delay of a call described by the token bucket (b, r), and being served with a link with bandwidth R, is bounded by b/R, for R>r.

Two kinds of user traffic which were previously mentioned are of particular interest: Sustained Constant Bit Rate (CBR), and Variable Bit Rate (VBR). CBR-type user applications create packets with equal constant inter-arrival intervals. Applications of this type are not bursty, and the token-bucket at the source can be represented with a token bucket size of one token. VBR-type applications, however, are bursty in nature, with the burstiness characterized by the token bucket size.

The delay that a packet encounters consists of two parts: a fixed delay (transmission and propagation delays) and a variable queue delay. In terrestrial wired networks, the fixed delay consists mainly of transmission delays, and propagation delays are negligible. However, since intra-satellite distances are large, propagation delays in satellite networks are comparable to queuing delays encountered by packets in transit. In order to provide guaranteed service in LEO satellite networks, the fixed delays should be taken into account while providing QoS. Two error terms, C and D represent the way in which the real network implementation of guaranteed services deviates from the fluid model. The error term C is a rate-dependent error term, which represents some fixed delays that a packet in a flow might experience. However, this term is dependent on the rate allocated to the flow. Examples of the error term C include the time required to transmit a packet in a TDMA-based system or the time taken in serializing a large packet broken up into ATM cells. The error term D represents the worst-case non-rate-based end-to-end transmission/propagation delays caused by hardware and physical constraints.

The bandwidth R that a connection receives depends on the error terms (C, D), and the end-to-end delay requirement $D_{req}$ of each packet, and is given by the following relationship:

$$R = \frac{b + C_{tot}}{D_{req} - D_{tot}},$$

where, b represents the token bucket size, $C_{tot}$, is the total rate-dependent delay experienced by a packet belonging to the call (the time required to transmit a packet), $D_{req}$ represents the end-to-end delay requirement of each packet, and $D_{tot}$ represents the total end-to-end transmission/propagation delay. In the LEO system that utilizes the predictive routing method of the present invention, C represents the maximum duration of time that a packet has to wait at the head of the queue of an outgoing inter-satellite link. Note that R is the amount of bandwidth required to guarantee the delivery of packets to the destination within a maximum time of $D_{req}$ time units. Essentially, by increasing R, it is possible to reduce the total time that a packet spends in a queue. Thus, if there exists a large end-to-end transmission/propagation delay between two end-users of a particular call when a particular route is chosen, then in order to satisfy the required delay bound for the call, a larger bandwidth must be allocated to that call on the route, as compared to when the call is routed on a different route with a smaller end-to-end transmission/propagation delay.

Current terrestrial routing protocols are not capable of providing QoS guarantees in LEO satellite networks with satellite-fixed cells, due to the inherent time-variance of the user traffic on the inter-satellite links. For example, implementing a typical terrestrial routing protocol in LEO satellite networks would provide a single route between the entering and egressing satellites covering a particular set of end-users by only considering the loading of the links at call set-up. Although the link capacities may be sufficient to accommodate the call at the call set-up phase on the determined route, this same route may not be able to maintain the requisite QoS for the entire duration of the call, since the loading on the links change in time as the users serviced by each satellite change as the satellites move along their orbits. Hence, a new routing protocol is needed that takes into account changes in the loading of the inter-satellite links due to the motion of the satellites. The protocol must maximize the total number of calls that are satisfactorily serviced by the network, while maintaining the QoS requirements of each of the calls.

The intuitive solution to the problem is to find a new route for the call whenever the original fails due to bottlenecks in the links. Although such a solution is feasible in a terrestrial wireless network, where handovers are infrequent and random, it is not the optimal solution for LEO satellite networks. Determining a whole new route as drop-offs are encountered in a LEO network may result in high messaging traffic, a high processing load on the network, and long interim delays for ongoing calls. Rather than re-routing a call, one can ensure that bottlenecks do not occur or are minimized. This is possible, for example, by reserving some portion of the bandwidth on the inter-satellite links just for handover calls. The drawback of this solution is that the reserved portion of the channel might be underutilized.

These drawbacks can be overcome by exploiting the predictability of the LEO satellite topology. As previously mentioned, LEO satellite topology can, at any arbitrary instant, be determined from the information on the connectivity of the constellation, and the satellite velocities. The users in the footprint of each satellite at any particular instant can also be determined by using the location information of the users. Thus, the total traffic that needs to be routed by each satellite at a particular time in the near future can be predicted. This information can be used at call set-up to intelligently determine multiple routes for the same call to help avoid predicted bottlenecks on the links. The advantage of this method is that the processing delays and the messaging overhead incurred due to handover route recomputation for an ongoing call are avoided. At the same time, only the required bandwidth is reserved at the appropriate times, and thus, the bandwidth utilization is improved.

Due to the limited on-board processing capability and the high mobility of the satellites, the routing function could be performed at "ground gateways", which store general network information such as the available bandwidth on each inter-satellite link, and the location and traffic patterns of users. The user traffic information will include, for each call, the type of the user application (such as CBR or VBR traffic), the rate at which packets are generated, and the delay or delay jitter requirements for a particular call.

When a user requests a new connection with another user, this request is forwarded to the gateway station. The request message reports the locations of the source and destination users, and the request delay bound. In determining a route between a pair of end-users in a LEO satellite network, the following issues should be taken into account: (1) the network resources, particularly the capacity of the inter-satellite links is limited, (2) there are an infinite number of QoS requirement variations, (3) QoS requirements should be satisfied for the duration of each call, (4) the network resources should be used efficiently, that is, the messaging and signaling overhead of the routing protocol should be minimized, and (5) memory and on-board processing capabilities of the satellites are limited, and thus, the amount of information stored for each connection at any satellite should be minimized. An example optimization criterion could be the maximization of the ratio of the mean number of calls that can be serviced by the system and the total number of calls requesting service at any given time, such that the requirements outlined above are satisfied.

Initially, the gateway determines a route for a given call according to the available satellite link bandwidths observed at the instant that the call request is received (e.g. at $t_0$). Due to satellite mobility, at time $t>t_0$, the satellite may serve users who may be required to use the same links as those used by the call under observation. This may result in an increase in the load (or possibly even a congestion) on these inter-satellite links. Any new call accepted should not degrade the QoS of ongoing calls. That is, calls that are in progress should have priority over new calls. In order to ensure that the QoS of ongoing calls is not degraded, the route chosen for a new call should be such that it does not cause congestion.

In order to predict future loads on the inter-satellite links, the ground gateways use the link state information (e.g. available bandwidth on the links and the routing table for calls serviced) obtained from the satellites. The residual bandwidths on the links along a determined route are checked to ensure that there is always sufficient bandwidth for the call, at all times t such that $t_0 < < t_0 + T_s$. If the route cannot accommodate the call at some time $t_1$, $t_0 < t_1 < t_0 + T_s$, because the minimum bandwidth on the route is less than the required bandwidth, a new route for the call is determined. The procedure is repeated until a feasible path for all t, $t_0 < t < t_0 + T_s$ is determined. If no feasible path can be found for any period of time between $t_0$ and $t_0 + T_s$, then the call is blocked. Thus, the method of the present invention yields a set of paths $S = \{p_0(t_0), p_1(t_1), \ldots, p_n(t_n)\}$, where $t_0 < t_1 < \ldots < t_n < t_0 + T_s$, and $t_i$ denotes the time at which use of the path $p_i$ to route packets from a source satellite to a destination satellite is begun.

It is sufficient to determine a set of paths for the time duration $[t_0, T_s]$, since as previously discussed; it is known that the traffic currently being served by a given satellite i will be served by satellite i+1 on the same orbit after $T_s$ time units. In other words, satellite i+1 effectively inherits the coverage of satellite i after $T_s$ time units.

When a new call request is received by the gateway, the gateway determines the location of the requesting users with respect to a reference framework. The reference framework is arbitrary, and represents the locations of the satellites and their respective footprints on the Earth when the system is initialized. From this framework, the gateway determines the end-satellites that would have been servicing the requesting users at the initialization time. Then, using the known fixed velocities of the satellites, the satellites that are currently servicing the end-users are determined. It is important to note that for routing purposes, the reference framework may be considered identical at times $t = k \cdot T_s$, where $k = 0, 1, 2, \ldots$. Thus, the gateway can perceive the network as a network of static virtual nodes, although the particular satellite, which represents a particular virtual node, will change every $T_s$ time units. However, the load on the satellites and the traffic on the inter-satellite links change for times t, such that $T_s > t > 0$, and the best routing decision at time $t_1$, $T_s > t_1 > 0$, may be different from the one at time $t=0$. The motivation for using a reference framework is to reduce the total number of states that are considered for routing purposes.

The link state information for every satellite changes continuously in time. However, continuously gathering and storing the link state information in such a dynamic environment is not practical. For this reason, the satellites regularly gather and forward the link state information with a pre-determined period $T_j$, which is dependent on the required precision in terms of proximity of the approximated discrete-time system to the original continuous time system, and the available storage and messaging facilities in the network. As $T_j$ gets smaller, the estimation of the future occurrence of the bottlenecks improves; however, the processing delays and the storage requirements may increase considerably. The link state information is also periodic with the period $T_s$ of the reference frame. By collecting the link state information with reasonable granularity, the total storage requirements per satellite can be minimized.

Figure 5:
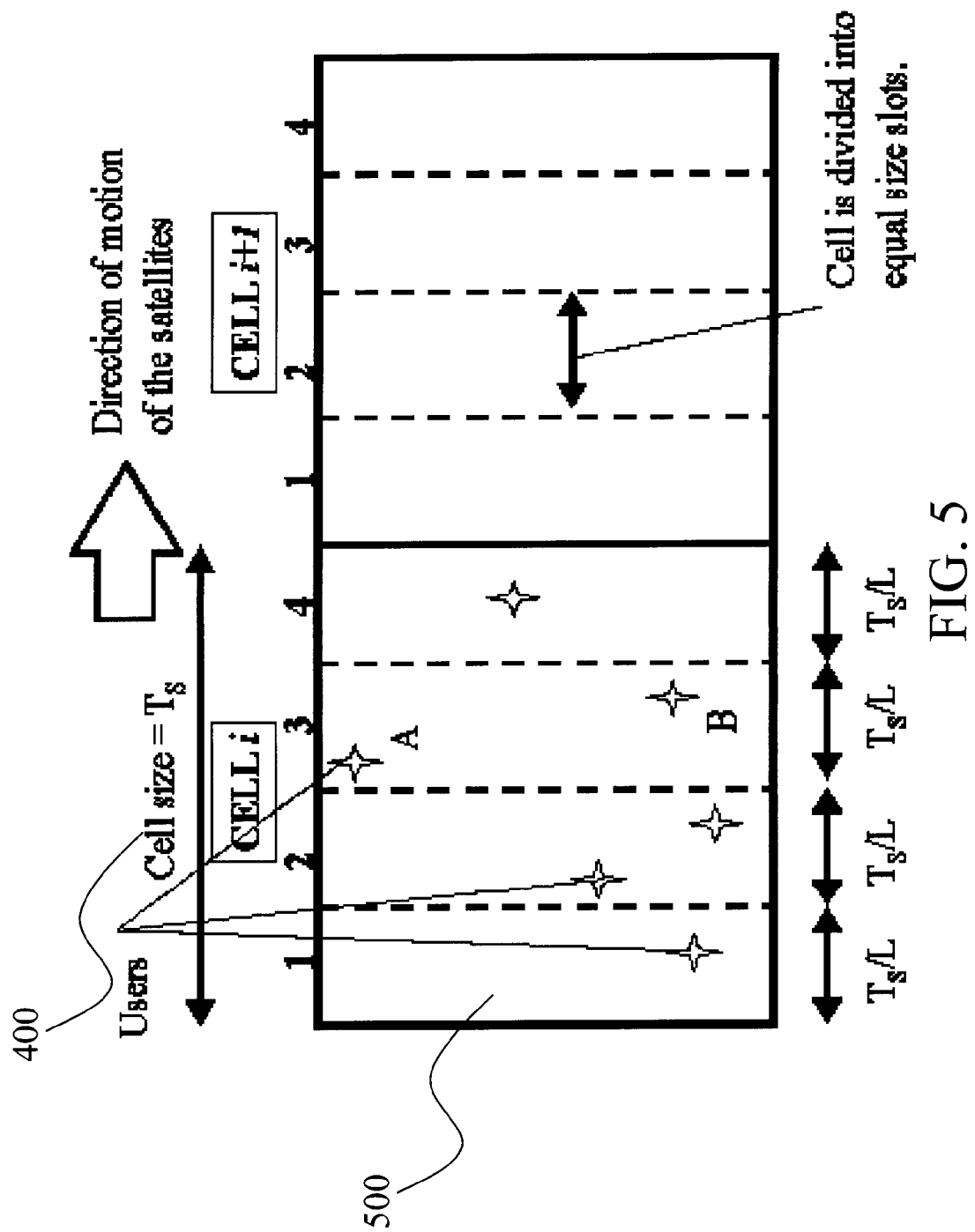
FIG. 5 is a diagram of two satellite-fixed cells, each divided into four slots having different numbers of users and having widths of $T_s/L$.
Figure 6:
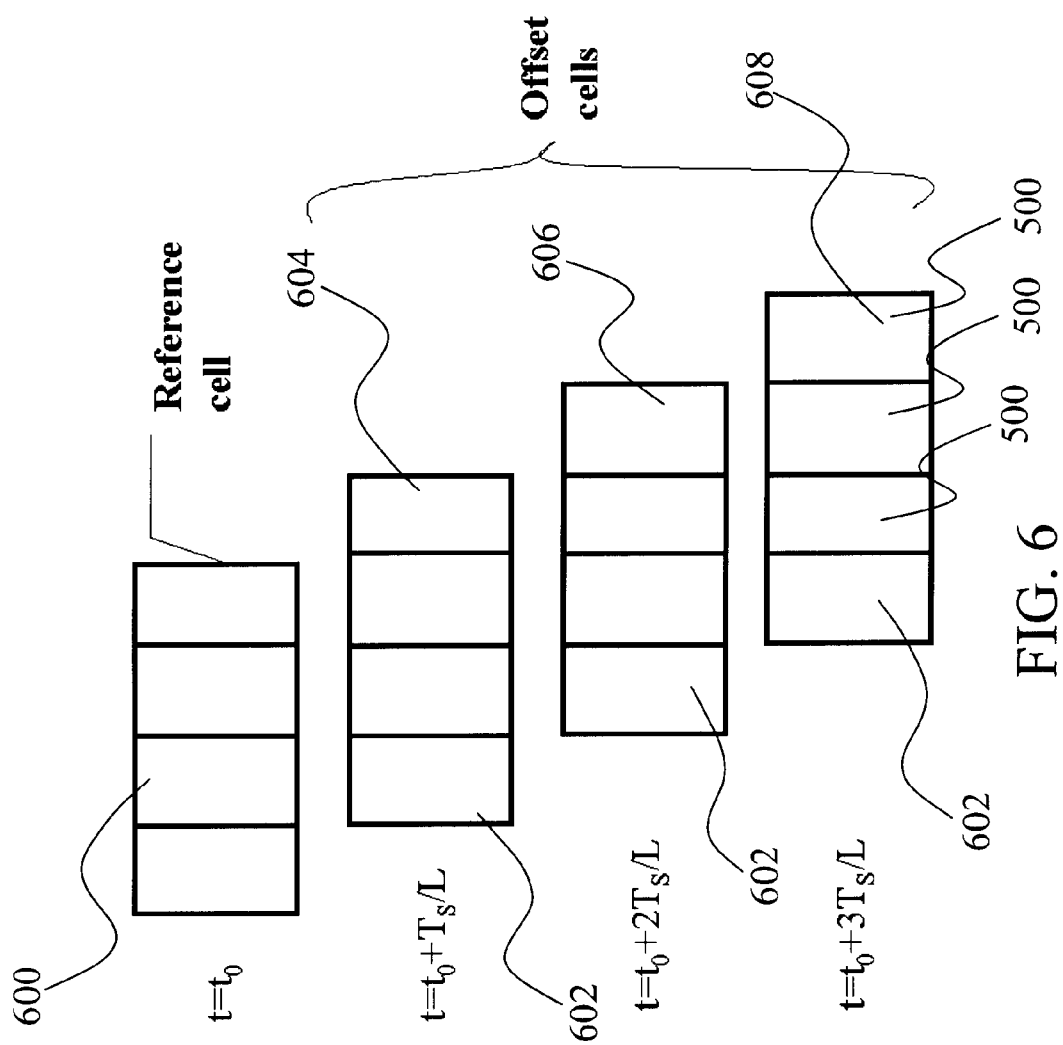
FIG. 6 is a diagram demonstrating the movement of a satellite-fixed cell in terms of offset cells.

Let each satellite cell 400 be divided into L equally sized slots 500, as depicted in FIG. 5. It is assumed that the satellites gather and store the link state information once every $T_j = T_s/L$ time units. Since the link state information exchanged is limited, the continuous movement of the satellite footprints is viewed by the routing functions as a series of discrete jumps. At each jump, the current satellite cell 400 is offset by one slot 500. Thus, the gateway perceives a cycle consisting of a reference cell 600 (corresponding to the reference framework) and (L−1) offset cells 602, as shown in FIG. 6. At each offset cell 602, the routing function considers only the users that are in the coverage area of this offset cell 602. Thus, according to this discrete time model, a satellite traverses its orbit by jumping from one slot 500 to the next in $T_s/L$ time units.

The specific example of the link state granularity shown in FIG. 5 and the cycle perceived by the gateway shown in FIG. 6 presented the case where L=4. Note that although L was chosen as equal to 4 for the examples of FIG. 5 and FIG. 6, L could be any value determined as optimal for a particular application. For example, assuming that a particular satellite has a coverage area consisting of slots 1, 2, 3, and 4 of reference cell i 600 at time $t=t_0$. As the satellite moves along its orbit, its offset cells coverage will consist of slots 2, 3, and 4 of reference cell i 600 and slot 1 of cell i+1 at time $t=t_0+T_s/L$ as shown by 604, slots 3 and 4 from cell i and slots 1 and 2 from cell i+1 at time $t=t+2T_s/L$ as shown by 606, and slot 4 from cell i and 1, 2, and 3 from cell i+1 at time $t=t_0+3T_s/L$ as shown by 608. The process repeats itself for every $T_s$ time units.

Let user A be located in slot 3 of a cell of size L=4 slots at time $t=t_0$ as shown in FIG. 5. Users A and B, which are in the same slot according to the reference framework, are considered to be at the same location when the method is implemented. However, user B will be handed over to the next satellite at a time later than the time at which user A is handed over. This problem in handling the location of the users with infinite accuracy may cause some of the routing decisions to be sub-optimal, but the consequences of these situations may be considered negligible if L is chosen to be sufficiently large. However, there is a tradeoff because increasing L results in more frequent link state updates, resulting in increased messaging and processing overhead in the network.

In every offset cell, the satellite network can be represented by a graph G=(V, E), with a vertex representing a satellite, and an edge representing an inter-satellite link connecting two adjacent satellites. Every edge has a weight, which is equal to the total residual bandwidth that is available on the corresponding inter-satellite link.

t is desirable to accommodate as many calls as possible within the constraints of network capacity. This is equivalent to finding a routing framework that would distribute the total traffic in the network in the most balanced fashion, or the framework that would minimize the load on the most congested link in the network. In order to achieve this goal, packets belonging to a new call are carried on routes that maximize the minimum residual link capacity in the network. The route chosen for a particular connection does not have to follow the minimum-hop path, as long as the QoS of the connection is satisfied. Thus, if it is necessary to change the route due to satellite motion, the bandwidth that is required on the alternate route may be higher than the bandwidth being allocated on the current route in order to compensate for the difference in propagation delays. In this case, in order to seamlessly transition between the routes, it is necessary to compute the new route, to compute the additional resources required on the new route, and to allocate the new route. This may require switching other connections to longer routes, if necessary, and if the delay constraints of the other routes are not stringent. The required bandwidth R for a particular connection with a required end-to-end delay bound $D_{req}$ is given by the previously stated equation, $$R = \frac{b + C_{tot}}{D_{req} - D_{tot}}.$$

In order to minimize both the control traffic messaging frequency and the routing table storage requirements in the satellites, it is also necessary to minimize the number of route changes for a particular connection due to satellite footprint movement. The set of paths that maximizes the minimum residual bandwidth for each offset cell l=1, 2, . . . , L may be quite different from one another. Since the objective is to minimize the amount of information that needs to be stored/propagated for a single flow, the protocol preferably ensures that the computed set of routes consists of a set of similar routes. In other words, the number of link changes required to transit from one route to another within the set should be minimized. Note that it is sufficient to store the original route, the changes with respect to the original route, and the times at which these changes will take effect. These entities correctly define the complete set of paths determined by the protocol. In order to compute this optimal set of routes, for each offset cell, a set of k ordered paths, $\{k_l\}$, is determined which maximizes the minimum residual bandwidth for that offset cell l, 0<l<L. One path is selected from each set $\{k_l\}$ such that the combined set of paths picked is optimal in the sense that the number of link changes required while transitioning among the paths in the chosen combined set is minimum as compared to the number of link changes required when transitioning among the paths in any other combined set which contains one path from each set $\{k_l\}$. This selection of the optimal combined set of paths is achieved through the use of a cost function that weighs the importance of the resemblance of the different paths chosen for different offset cells, to the maximization of the minimum residual bandwidth in the network.

Figure 7:
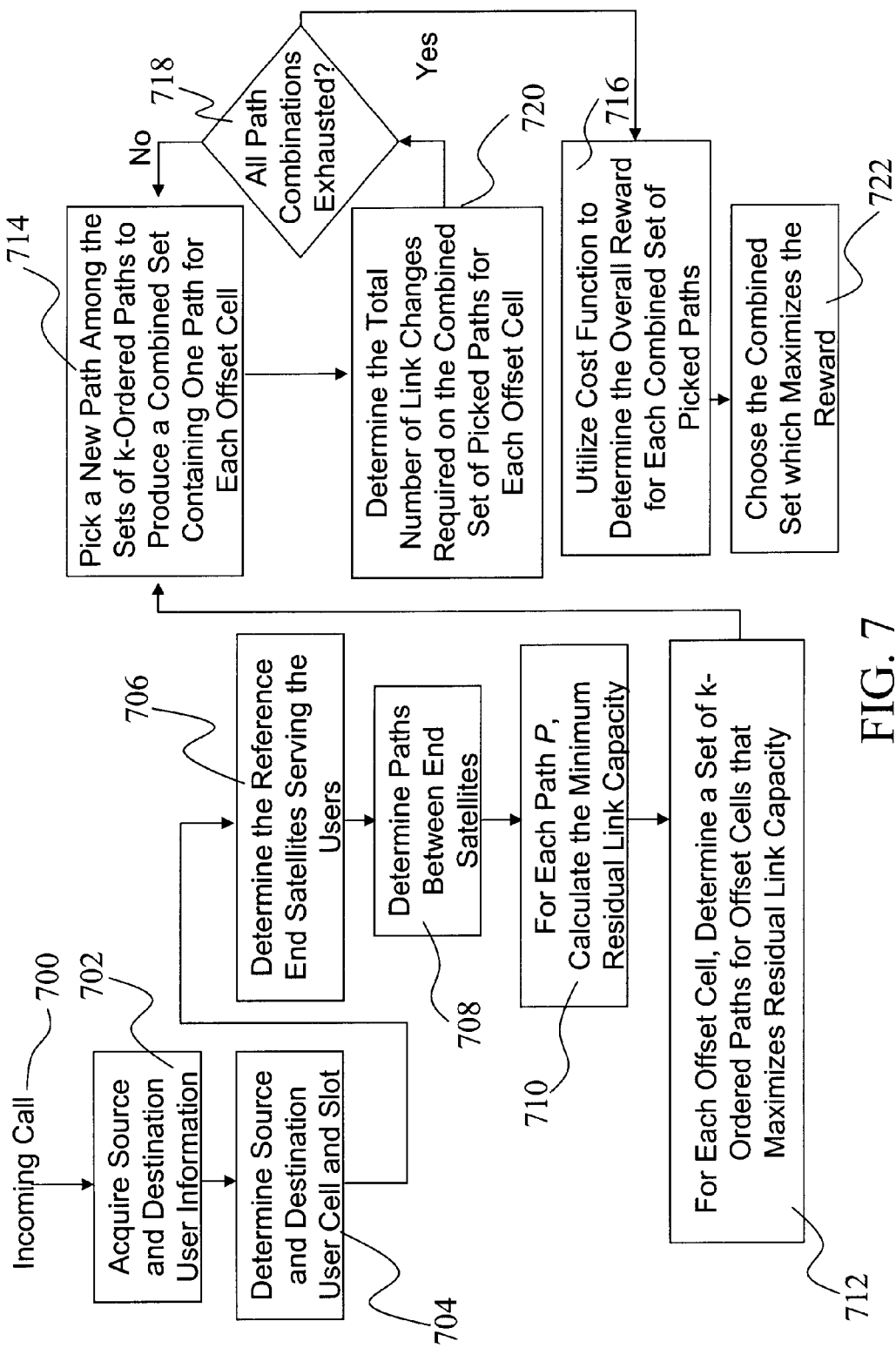
FIG. 7 is a flowchart showing the general steps of the predictive routing method of the present invention.

In summary, the method described herein may be as follows. Let $c_i(l)$ be the current link capacity on link i at offset cell l, d(p) be the end-to-end propagation delay for a chosen path p if the connection is admitted on the offset cell l. Then, as depicted in the flowchart of FIG. 7, the predictive routing method is as follows:

(a) Convert source and destination user location information (measured in longitude and latitude) to the reference cell and slot information, i.e. identify the reference cell and the slot within the cell where the user is located;

(b) For l=1, 2, . . . , L (e.g. for all offset cells),
  ii. determine the reference end satellites serving the users;
  iii. determine all paths with J or less number of hops connecting these end satellites;
  iv. for each path, p, calculate the minimum residual link capacity, which is $r_p(l) = c_i(l) - R_p$; and
  v. where, $$R_p = \frac{(b + C_{tot})}{(D_{req} - d(p))},$$

determine k-ordered paths for offset cell l, $\{k_l\}$ that maximize the residual link capacity;

(c) For each offset cell l=1, 2, . . . , L, pick a path among each of the k-ordered paths, $\{k_l\}$ determined above, to produce a combined set of picked paths $S_m$, where m=1, . . . , $k^L$;

(d) Determine total number of link changes $H_{Sm}$ required on this set of paths as transit occurs the paths. Repeat steps (c) and (d) for each different combination of k-ordered paths;

(e) Determine the overall reward for each combination set $S_m = \{p_1(i_1), p_2(i_2)\}, \ldots$, where $i_1 = 1, \ldots, k$ is the path chosen for offset cell l, by:

$$reward(S_m) = \sum_{l=1}^{L} r_p(l) - W \cdot H_{Sm},$$

where W is a constant used to weigh the relative importance of having few link changes on the route for the call as offset calls are transitioned, with respect to the balancing of the user traffic.

(f) Choose the $S_m$ that maximizes the reward.

After a path for every offset cell l=1, 2, . . . , L has been determined for the connection, the necessary bandwidth for each path to satisfy the QoS requirements is reserved along the links forming the paths. However, since the reservation is made only for a slot duration, the same bandwidth can be possibly used in other offset cells for other connections. Thus, network utilization is improved.

A flowchart is presented in FIG. 7, illustrating the method of the present invention. First, a new incoming call 700 is received. Upon receipt, the source and destination user information is acquired in a user information-acquiring step 702. Next, using the source and destination user information, the cell and slot of source and of the destination are determined in a cell/slot-determining step 704. Subsequently, using the cell and slot information, the reference end satellites serving the source and destination users are determined in a reference end satellite-determining step 706. Next, using the reference end satellites, paths between the end satellites are determined in a path-determining step 708. Using the paths developed in the path-determining step 708, for each path p, the minimum residual link capacity is calculated in a link capacity-calculating step 710. After calculating the minimum residual link capacity for each path, for each offset cell, a set of k-ordered paths for the offset cells is developed, which maximizes the residual link capacity in a path set optimizing step 712. Subsequently, a new path is picked among the sets of k-ordered paths to produce a combined set of picked paths for each offset cell in a new path-picking step 714. Next, the total number of link changes required on the combined set of picked paths for each offset cell is determined in a link change-determining step 716. The new path picking step 714 and the link change-determining step 716 are repeated until the link changes have been determined for all of the paths. The yes/no operator 718 provides this operation. Once the link changes have been determined for all of the paths, a cost function is utilized to determine the overall reward for each combined set of picked paths in a reward-determining step 720. Finally, once the overall reward for each set of picked paths has been determined the combined set that maximizes the reward is chosen in a path-choosing step 722. The chosen path is then used to facilitate the received new call 700. The method, as shown, is repeated each time a new call is received in order to efficiently route the call through the satellite network.

When a packet is generated, the offset cell in which it was generated is determined. Then, the route corresponding to this offset cell is used to forward the packet from the virtual node serving the source user terminal to the virtual node serving the destination user terminal.

As shown in the table of FIG. 8, the user packet headers preferably have the following information fields:

1. Source user address: The address of the source user is specified according to the cell and the slot the user is located at with respect to the reference framework;
2. Destination user address;
3. Flow identification number: Since the addressing scheme does not refer to an exact location, but rather a region, there may be multiple flows with the same source and destination user address. In order to differentiate between the flows, each flow is identified with a different unique flow identification number; and
4. Timestamp: The packets are time stamped by the source node to indicate the time of creation of the packet. This information is used by the intermediate nodes to identify the offset cell in which the packet is generated.

When a packet is received at an intermediate node, the node examines the source and the destination addresses, and the flow identification number, and determines the set of paths used by the connection. From the timestamp, the intermediate node determines the offset cell that the packet is generated in. The route corresponding to this offset cell is used for the transfer of the packet from the source user terminal to the destination user terminal.

The packet-forwarding method may be formulated as follows.

(a) From the time stamp on the packet, determine the offset cell in which the packet is created; and
(b) Look up the path corresponding to that offset cell in order to determine the next hop.

The LEO routing method of the present invention has been tested using a simulated network of 25 satellites, consisting of five orbital planes, each having five satellites. The resulting configuration provides a 5×5 toroidal mesh network. The cells were assumed to be adjacent, non-overlapping, and rectangular, and the time taken by a satellite to traverse one cell was assumed to be one second. Every cell was divided into five equal-length slots. Thus, the satellites were assumed to traverse a slot in 0.2 seconds. Furthermore, the weighting factor W was considered to be zero.

As previously discussed, a call is considered blocked when no combined set of paths can be found for a particular call. There were two performance metrics considered—new call blocking probability and packet dropping probability. A packet was considered dropped when it violates the call's delay requirement.

In the first part of the testing, the connections were voice or video calls having CBR flows. The end-users were distributed uniformly over the coverage area. Calls arrived according to a uniform distribution with a mean inter-arrival according to a uniform distribution with a mean inter-arrival time of 5.0 seconds. The duration of each call is the outcome of a uniform distribution with a mean of 2.0 seconds. Each call generates 100 packets per second. The size of a packet was 210 bytes. Every call has the same delay requirement $D_{req}$; that is, every packet of this call should be delivered at the destination in $D_{req}$ seconds. The average propagation delay on each inter-satellite link was assumed at 20 milliseconds.

Figure 9:
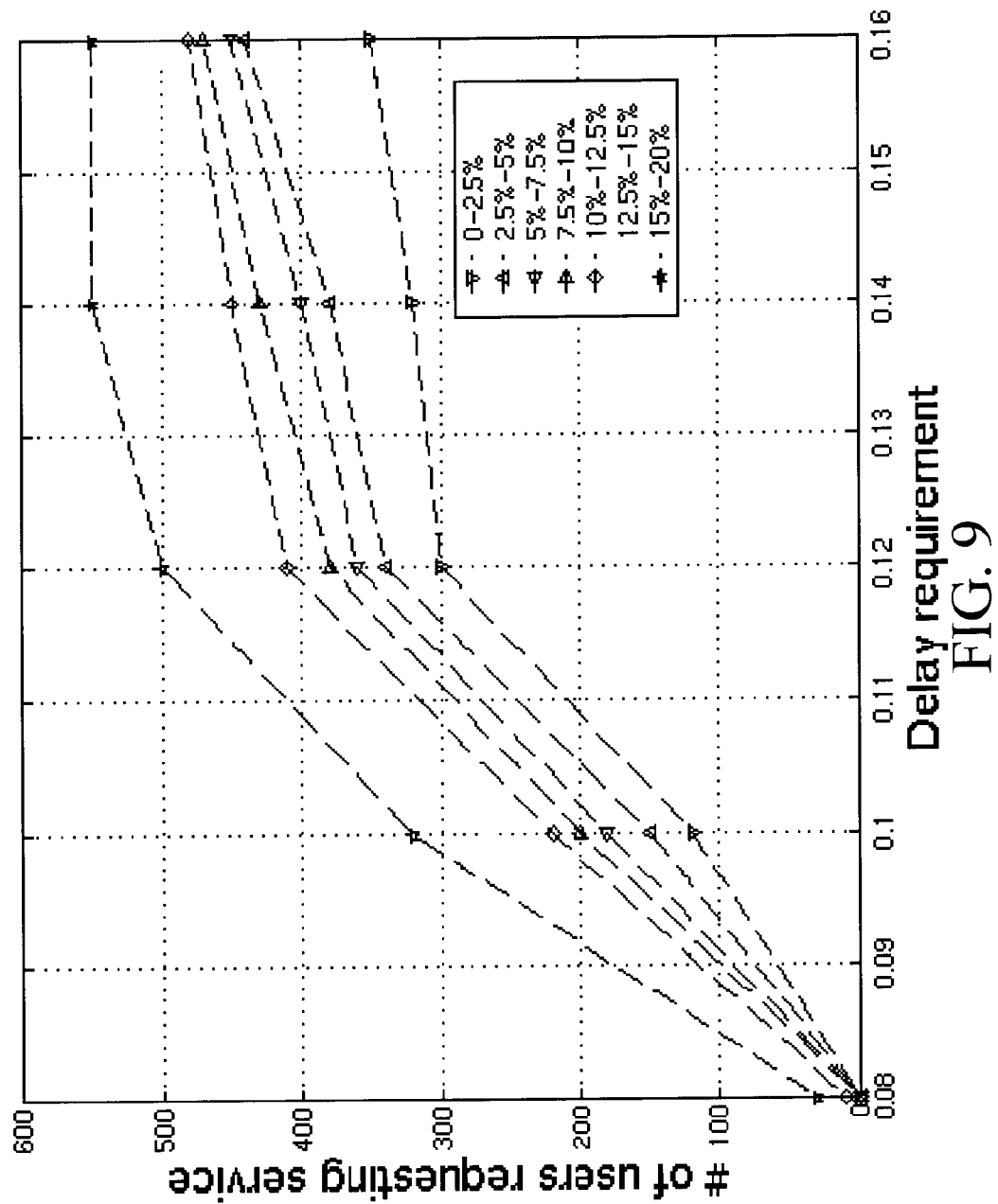
FIG. 9 is a graph that provides test/simulation results of an embodiment of the present invention demonstrating the maximum total number of users that can be serviced by a LEO satellite network versus delay requirement using the method of the present invention under a particular set of test assumptions described herein.

The total number of calls, having a given delay requirement, that can be serviced by the LEO satellite network with the method of the present invention is depicted in FIG. 9. The results were parameterized according to the acceptable blocking probability. The average packet dropping probability for any given blocking rate was approximately 2%. The bandwidth on an inter-satellite link was assumed to be 1 Mbps. As the delay requirement was relaxed the total number of calls that could be serviced increased. If the blocking rate requirement is strict, the number of users that can be served by the system was quite low. For example, for $D_{req}$=80 ms, no flows can be admitted if the blocking requirement is as low as 5%.

From FIG. 9, it may be seen that the maximum total number of users that can be serviced by the LEO satellite network with the method of the present invention is approximately 450 if a blocking probability of 15% to 20% is permitted. The graph shown in FIG. 9 may be used to implement an admission control policy to restrict the number of flows for achieving a desired blocking probability and delay requirement when the method of the present invention is used.

Figure 10:
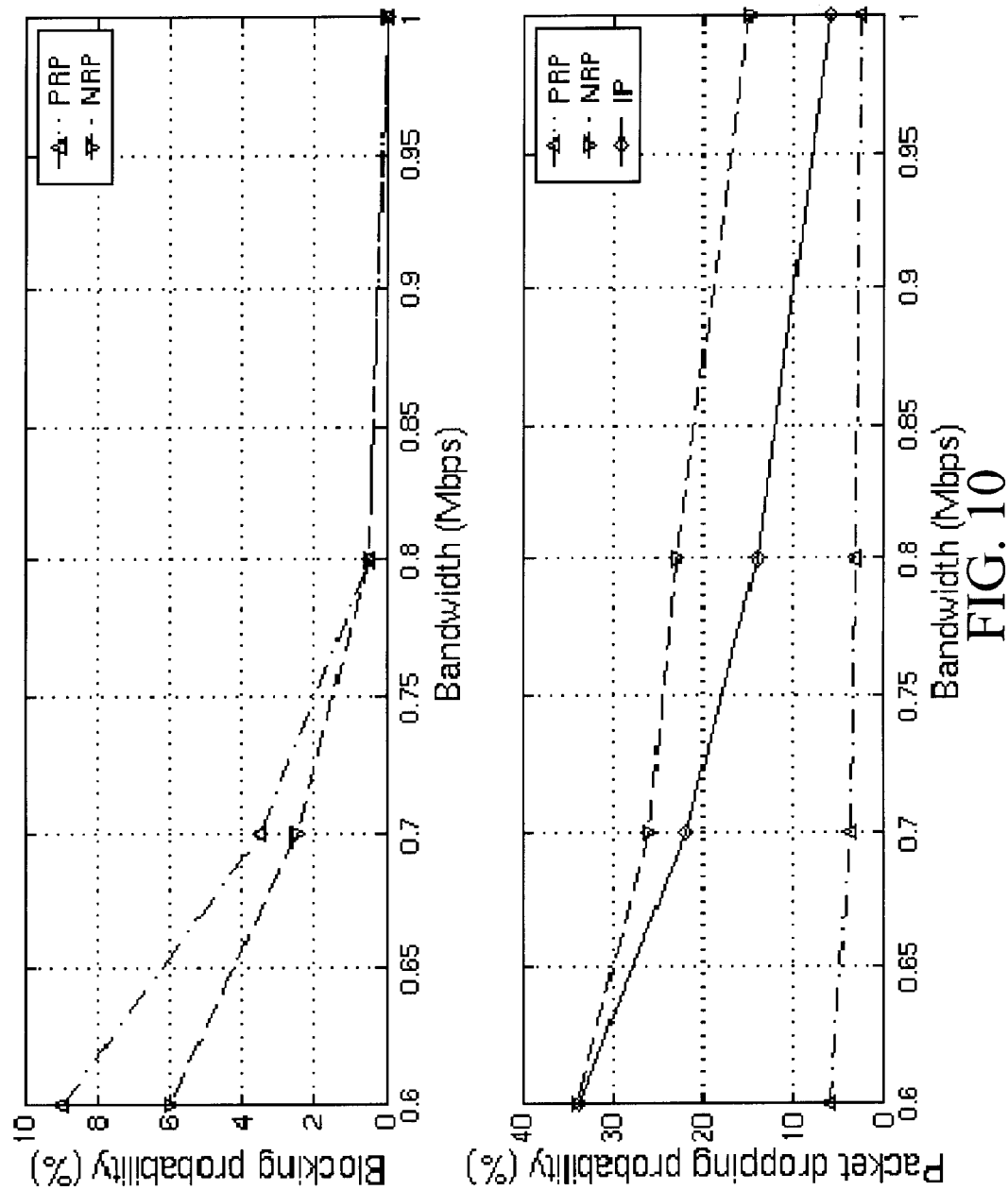
FIG. 10 is a set of graphs, providing a comparison of the performance of the predictive routing method of the present invention with a non-predictive routing method and an Internet Protocol routing method, and presenting the blocking probability versus bandwidth and the packet dropping probability versus bandwidth for Constant Bit Rate (CBR) traffic.

The performance of the predictive routing method of the present invention is compared with a non-predictive routing method and IP routing method in FIG. 10. The IP routing method routes packets according to a shortest path method. In this context, the computed route is the same as the minimum-hop path between the end-satellites. The shortest paths between the satellite nodes are calculated at the beginning of the IP method. The IP routing neither considers the loading on the links, nor does it reserve any bandwidth for the call. Hence, it may route packets along congested links.

When a new call arrives, the non-predictive routing method determines a path between the end-satellites serving the corresponding terrestrial end-users by considering the traffic on the inter-satellite links only at the call setup. The path determined by the non-predictive routing method maximizes the minimum residual link capacity of the LEO inter-satellite links at call setup. The bandwidth needed to satisfy the delay requirement of the call is also reserved at call setup.

The total number of users requesting service is 200, as may be seen in FIG. 10. The delay requirement for all calls is 100 ms. For testing purposes, the blocking and packet dropping probabilities were determined by varying the inter-satellite link capacities. The predictive routing method of the present invention was found to have a higher blocking probability than that of the non-predictive routing method, since the predictive routing method provides more stringent QoS guarantees than the non-predictive routing method. Unlike the non-predictive routing method, the predictive routing method of the present invention takes into account the dynamics of traffic changes due to satellite mobility while computing the optimal routes. This situation is apparent from the packet dropping rates shown in FIG. 10.

Figure 11:
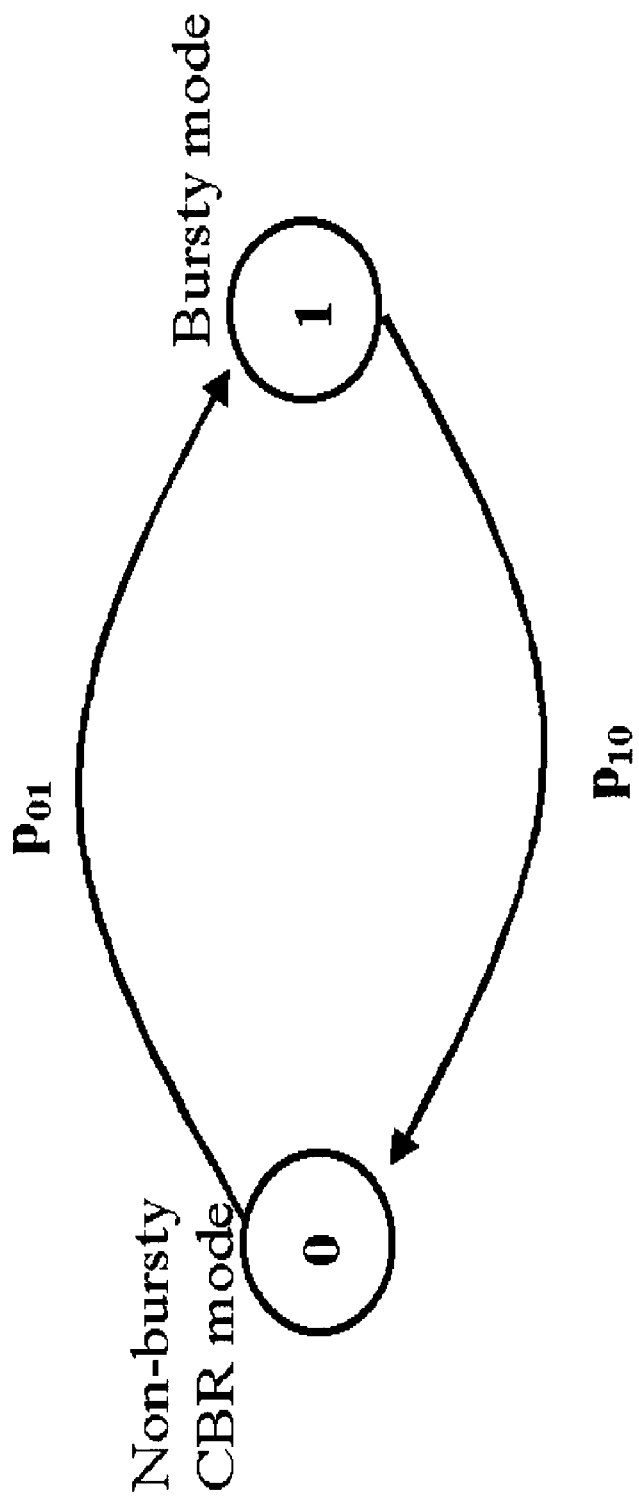
FIG. 11 is a nodal representation of the two-state Markov Chain used to model the Variable Bit Rate (VBR) source used for testing/simulating the method of the present invention.
Figure 12:
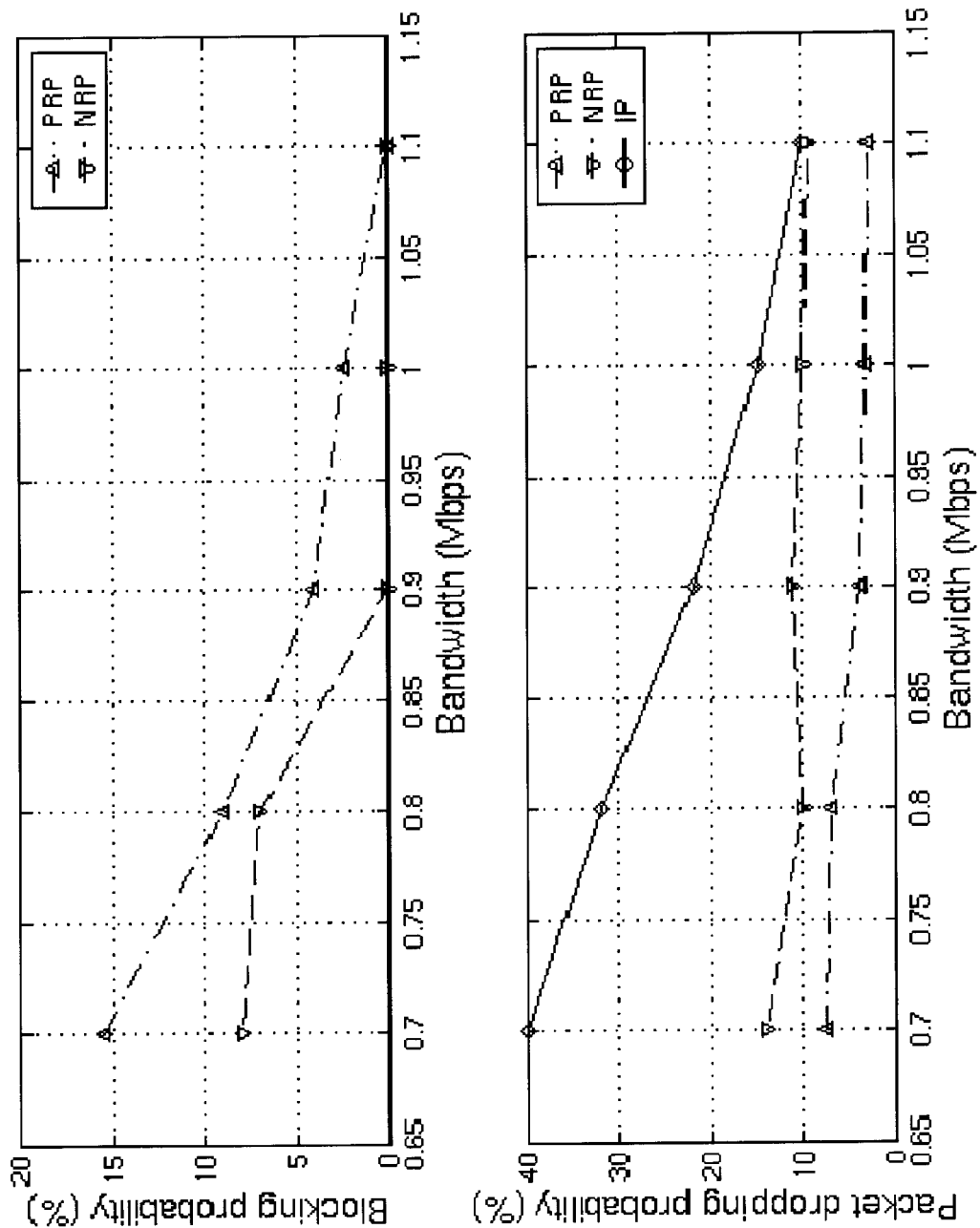
FIG. 12 is a set of graphs, providing a comparison of the performance of the predictive routing method of the present invention with a non-predictive routing method and an Internet Protocol routing method, and presenting the blocking probability versus bandwidth and the packet dropping probability versus bandwidth for VBR traffic.

For testing purposes, the VBR source was modeled as a two-state Markov Chain, as depicted in FIG. 11. Test results for the predictive routing method of the present invention for VBR-type calls are shown in FIG. 12. For testing, the total number of users requesting service was set to 200, and the deterministic delay requirement for the packets was set to 100 ms. As may be seen, when the Markov chain is in state 0, it generates packets with equal constant inter-arrival times of 10 ms. The source switches to state 1 with probability 0.2. When the Markov chain is in state 1, it generates packets with inter-arrival times conforming to an exponential random variable with mean 3.33 ms. The token bucket size b was set to 10. The token rate r was set to 8 ms. The VBR source switches back to state 0 with a probability of 0.2. The results shown in FIG. 12 show that, as expected, the predictive routing method of the present invention has a higher blocking probability as compared to the non-predictive routing method, but the packet dropping probability of the predictive routing method of the present invention is much lower than that of the non-predictive routing method.

Figure 13:
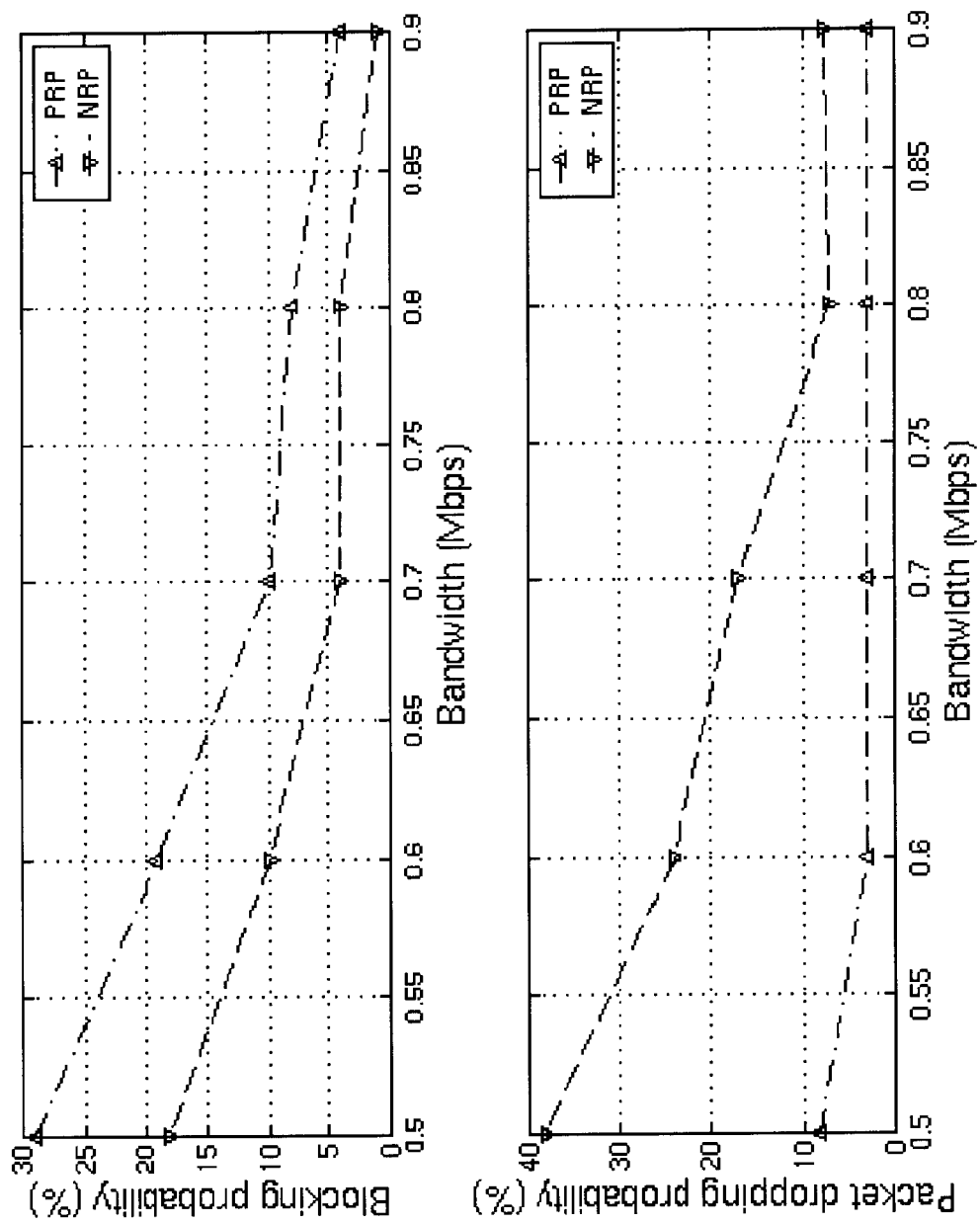
FIG. 13 is a set of graphs, providing a comparison of the performance of the predictive routing method of the present invention with a non-predictive routing method, and presenting the blocking probability versus bandwidth and the packet dropping probability versus bandwidth in the case where the users are distributed non-uniformly over the coverage area.
Figure 7:
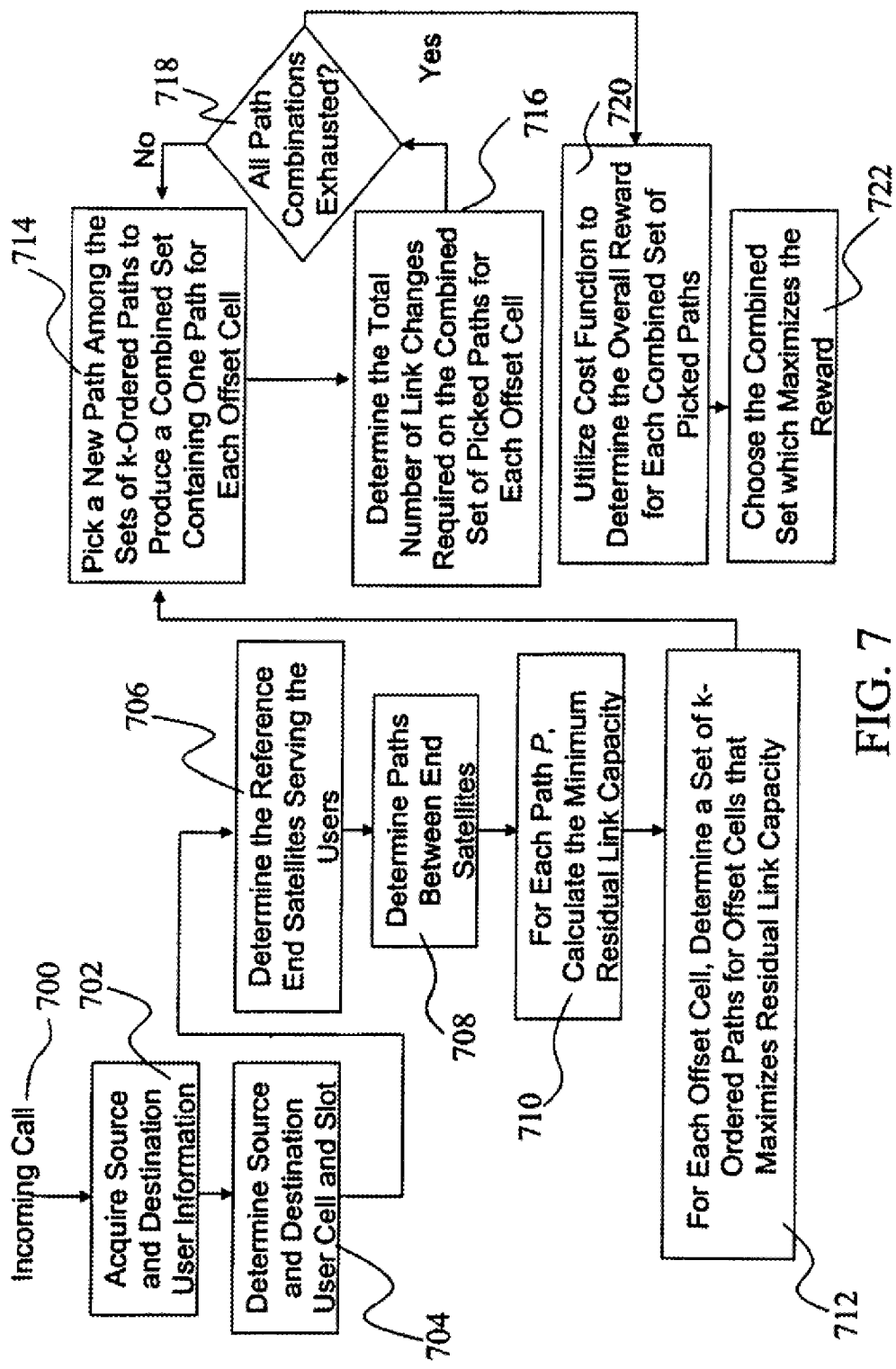

The performance of the predictive routing method of the present invention, as compared with the non-predictive routing method, for a non-uniform user traffic distribution may be seen in FIG. 13. The abscissa of the cells in which the source and destination users reside is determined according to the following probability vector V=(0.066, 0.13, 0.2, 0.26, 0.33), where the $l^{th}$ entry of V refers to the probability of having a particular user in one of the five cells corresponding to the $l^{th}$ column of the 5×5 reference mesh network. The ordinate of the cells that determine as to where the source and destination terrestrial users reside follow a uniform distribution. The connections are CBR flows, with a packet generation rate of 100 packets/second. The deterministic delay requirement for all the calls is the same, which is 100 ms. The propagation delay on each inter-satellite link was 20 ms. From FIG. 13, it may be observed that, as expected, the predictive routing method of the present invention outperforms the non-predictive routing method in terms of the packet dropping rates.

Broadband LEO satellite networks will complement current terrestrial broadband networks, and will provide service to users regardless of their location. The present invention has been discussed relative to a broadband LEO satellite network with an emphasis on delivering deterministic QoS to users. It is considered that the traffic on inter-satellite links between the satellite nodes changes dynamically as the satellites move along their orbits. In order to deliver QoS guarantees, these variations in traffic are taken into account. The predictive routing method of the present invention exploits the deterministic nature of the LEO satellite topology in order to facilitate the delivery of QoS guarantees without over reserving capacity on the inter-satellite links. An admission control curve has been developed through testing, which may be used to ensure that the desired QoS metrics may be guaranteed.

Although the present invention has been discussed in terms of a ground gateway-based routing function, depending on the capabilities of LEO constellation-member satellites, the routing function may also be satellite-based. Additionally, the routing function may be stationed on a satellite outside the LEO constellation. Furthermore, although the predictive routing method of the present invention has been discussed relative to use with LEO satellite systems, it may be adapted for use with other satellite systems, such as medium earth orbit satellite systems, depending on the needs of the particular embodiment.

What is claimed is:

1. A method for predictive QoS routing of calls within a satellite network including the steps of:
   a. providing a satellite constellation orbiting the earth, said satellite constellation including at least one orbit, with each one of the at least one orbit including a plurality S of satellites, each indexed by a number s, and communicatively connected by a plurality of communication links, with each particular satellite having a satellite-fixed cell divided perpendicularly with respect to the orbit of the particular satellite, into a plurality L of satellite-fixed cell slots, with the movement of the plurality S of satellites over the earth being characterized in that the satellite-fixed cell for a satellite indexed at s covers the same area as the satellite-fixed cell of a satellite indexed at s+1 after passing over an area on the earth equivalent to the area of L satellite-fixed cell slots, and with an offset satellite-fixed cell being defined each time the satellite-fixed cell covers the area of one of L satellite-fixed cell slots while moving between the position of the satellite-fixed cell corresponding to a satellite indexed s and the satellite-fixed cell corresponding to a satellite indexed s+1, providing L offset satellite-fixed cells with the L offset satellite-fixed cells for each particular satellite being indexed by a number l=1, . . . , L, with the satellite-fixed cells and the offset satellite-fixed cells being defined as reference satellite-fixed cells;
   b. receiving a call from a source user to a destination user, the call having a particular QoS requirement;
   c. acquiring information regarding the source user and the destination user, including a user address and user location;
   d. determining the satellite, the satellite-fixed cell, and the satellite-fixed cell slot within the satellite-fixed cell in which the source user is located, said satellite being defined as the source user end-reference satellite;
   e. determining the satellite, the satellite-fixed cell, and the satellite-fixed cell slot within the satellite-fixed cell in which the destination user is located, said satellite being defined as the destination user end-reference satellite;
   f. determining all paths including, at most, a preset number J of inter-satellite hops, between the source user end-reference satellite and the destination end-user reference satellite;
   g. calculating a minimum residual link capacity for each of the paths determined in step (f);
   h. determining, for each offset satellite-fixed cell l=1, . . . , L, a set $\{k_l\}$ of paths that maximize the residual bandwidth at that offset satellite-fixed cell;
   i. picking, from each set $\{k_l\}$ of paths determined for each offset satellite-fixed cell, one path p such that the combined set CS of paths for all of the offset satellite-fixed cells minimizes the number of communication link changes necessary to maintain a call between the source user and the end user as the satellites move in their orbits; and
   j. reserving at each offset satellite-fixed cell, the bandwidth along the path picked in step i, corresponding to the particular QoS requirement of the call.

2. A method for predictive QoS routing of calls within a satellite network as set forth in claim 1, wherein the calculation of the minimum residual link capacity for each of the plurality of paths at a given offset satellite-fixed cell l is defined by $r_p(l)=c_i(l)-R_p$, where $c_i(l)$ is the current link capacity of link i at offset satellite-fixed cell l, and where $R_p$ represents the bandwidth required for a new call on path p if the connection is admitted in the offset satellite-fixed cell l, and where $$R_p = \frac{(b + C_{tot})}{(D_{req} - d(p))},$$

where b represents the token bucket size, $C_{tot}$ represents the total rate-dependent delay experienced by a packet belonging to the call, $D_{req}$ represents the end-to-end delay requirement of each packet, and d(p) represents the end-to-end propagation delay for a chosen path p if the connection is admitted on the offset satellite-fixed cell l.

3. A method for predictive QoS routing of calls within a satellite network as set forth in claim 2, wherein the step of picking a path from each set of $\{k_l\}$ paths includes the sub-steps of:

i. picking, for each set of paths $\{k_l\}$ for offset satellite-fixed cells l=1, . . . ,L, a path, where the combined set of picked paths over all of the offset satellite-fixed cells l=1, . . . ,L is defined as a combined set of picked paths $CS_m$, where m=1, . . . ,$k^L$;

ii. determining the total number of link changes $H_{Sm}$ required on the combined set of picked paths CS;

iii. repeating sub-steps i and ii for each different combination of paths;

iv. determining an overall reward for each combination set $S_m = \{p_1(i_1), p_2(i_2), \ldots, p_L(i_L)\}$, where $i_1 = 1, \ldots, k$ is the path chosen for offset satellite-fixed cell l, by:

$$reward(S_m) = \sum_{l=1}^{L} r_p(l) - W \cdot H_{Sm},$$

where W is a constant used to weigh the relative importance of having few link changes on the route for the call as offset calls are transitioned, with respect to the balancing of the user traffic;

v. choosing the $S_m$ that maximizes the reward($S_m$); and vi. after a path for every offset satellite-fixed cell l=1, 2, . . . , L has been determined for the connection, reserving the necessary bandwidth for each path to satisfy the QoS requirements along the links forming the paths.

4. A method for predictive QoS routing of calls within a satellite constellation orbiting the earth, said satellite constellation including at least one orbit, with each one of the at least one orbit including a plurality S of satellites, each indexed by a number s, and communicatively connected by a plurality of communication links, with each particular satellite having a satellite-fixed cell divided, perpendicularly with respect to the orbit of the particular satellite, into a plurality L of satellite-fixed cell slots, with the movement of the plurality S of satellites over the earth being characterized in that the satellite-fixed cell for a satellite indexed at s covers the same area as the satellite-fixed cell of a satellite indexed at s+1 after passing over an area on the earth equivalent to the area of L satellite-fixed cell slots, and with an offset satellite-fixed cell being defined each time the satellite-fixed cell covers the area of one of L satellite-fixed cell slots while moving between the position of the satellite-fixed cell corresponding to a satellite indexed s and the satellite-fixed cell corresponding to a satellite indexed s+1, providing L offset satellite-fixed cells with the L offset satellite-fixed cells for each particular satellite being indexed by a number l=1, . . . , L, with the satellite-fixed cells and the offset satellite-fixed cells being defined as reference satellite-fixed cells, said method including the steps of:

a. receiving a call from a source user to a destination user;

b. acquiring information for the source user and the destination user, including a user address and user location;

c. determining the satellite, the satellite-fixed cell, and the satellite-fixed cell slot within the satellite-fixed cell in which the source user is located, said satellite being defined as the source user end-reference satellite;

d. determining the satellite, the satellite-fixed cell, and the satellite-fixed cell slot within the satellite-fixed cell in which the destination user is located, said satellite being defined as the destination user end-reference satellite;

e. determining all paths including at most a predetermined number J of inter-satellite hops, between the source user end-reference satellite and the destination end-user reference satellite;

f. calculating the minimum residual link capacity for each of the paths determined in step (e);

g. determining, for each offset satellite-fixed cell l=1, . . . ,L, a set $\{k_l\}$ of paths that maximize the residual bandwidth at that offset satellite-fixed cell; and h. picking, from each set $\{k_l\}$ of paths determined for each offset satellite-fixed cell, one path p such that the combined set CS of paths for all of the offset satellite-fixed cells minimizes the number of communication link changes necessary to maintain a call between the source user and the end user.

5. A method for predictive QoS routing of calls within a satellite network as set forth in claim 4, wherein the calculation of the minimum residual link capacity for each of the plurality of paths at a given offset satellite-fixed cell l is defined by $r_p(l) = c_i(l) - R_p$, where $c_i(l)$ is the current link capacity link i at offset satellite-fixed cell l, and where $R_p$ represents the bandwidth required for a new call on path p if the connection is admitted in the offset satellite-fixed cell l, and where $$R_p = \frac{(b + C_{tot})}{(D_{req} - d(p))},$$

where b represents the token bucket size, $C_{tot}$ represents the total rate-dependent delay experienced by a packet belonging to the call, $D_{req}$ represents the end-to-end delay requirement of each packet, and d(p) represents the end-to-end propagation delay for a chosen path p if the connection is admitted on the offset satellite-fixed cell l.

6. A method for predictive QoS routing of calls within a satellite network as set forth in claim 5, wherein the step of picking a path from each set of $\{k_l\}$ paths includes the sub-steps of:

i. picking, for each set of paths $\{k_l\}$ for offset satellite-fixed cells l=1, . . . ,L, a path, where the combined set of picked paths over all of the offset satellite-fixed cells l=1, . . . ,L is defined as a combined set of picked paths $CS_m$, where m=1, . . . ,$k^L$;

ii. determining the total number of link changes $H_{Sm}$ required on the combined set of picked paths CS;

iii. repeating sub-steps i and ii for each different combination of paths;

iv. determining an overall reward for each combination set $S_m = \{p_1(i_1), p_2(i_2), \ldots, p_L(i_L)\}$, where $i_1 = 1, \ldots, k$ is the path chosen for offset satellite-fixed cell l, by:

$$reward(S_m) = \sum_{l=1}^{L} r_p(l) - W \cdot H_{Sm},$$

where W is a constant used to weigh the relative importance of having few link changes on the route for the call as offset calls are transitioned, with respect to the balancing of the user traffic;

v. choosing the $S_m$ that maximizes the reward($S_m$); and vi. after a path for every offset satellite-fixed cell l=1, 2, . . . , L has been determined for the connection, reserving the necessary bandwidth for each path to satisfy the QoS requirements along the links forming the paths.

7. An apparatus for predictive QoS routing of calls within a satellite network including:

a. a satellite constellation orbiting the earth, said satellite constellation including at least one orbit, with each one of the at least one orbit including a plurality S of satellites, each indexed by a number s, and communicatively connected by a plurality of communication links, with each particular satellite having a satellite-fixed cell divided, perpendicularly with respect to the orbit of the particular satellite, into a plurality L of satellite-fixed cell slots, with the movement of the plurality S of satellites over the earth being characterized in that the satellite-fixed cell for a satellite indexed at s covers the same area as the satellite-fixed cell of a satellite indexed at s+1 after passing over an area on the earth equivalent to the area of L satellite-fixed cell slots, and with an offset satellite-fixed cell being defined each time the satellite-fixed cell covers the area of one of L satellite-fixed cell slots while moving between the position of the satellite-fixed cell corresponding to a satellite indexed s and the satellite-fixed cell corresponding to a satellite indexed s+1, providing L offset satellite-fixed cells with the L offset satellite-fixed cells for each particular satellite being indexed by a number l=1, . . . , L, with the satellite-fixed cells and the offset satellite-fixed cells being defined as reference satellite-fixed cells;

b. means for receiving a call from a source user to a destination user;

c. means for acquiring information for the source user and the destination user, including a user address and user location;

d. means for determining the satellite, the satellite-fixed cell, and the satellite-fixed cell slot within the satellite-fixed cell in which the source user is located, said satellite being defined as the source user end-reference satellite;

e. means for determining the satellite, the satellite-fixed cell, and the satellite-fixed cell slot within the satellite-fixed cell in which the destination user is located, said satellite being defined as the destination user end-reference satellite;

f. means for determining all paths including at most a predetermined number J of inter-satellite hops, between the source user end-reference satellite and the destination end-user reference satellite;

g. means for calculating the minimum residual link capacity for each of the paths determined by the means in (f);

h. means for determining, for each offset satellite-fixed cell l=1, . . . ,L, a set $\{k_l\}$ of paths that maximize the residual bandwidth at that offset satellite-fixed cell; and i. means for picking, from each set $\{k_l\}$ of paths determined for each offset satellite-fixed cell, one path p such that the combined set CS of paths for all of the offset satellite-fixed cells minimizes the number of communication link changes necessary to maintain a call between the source user and the end user.

8. An apparatus for predictive QoS routing of calls within a satellite network as set forth in claim 7, wherein the calculation of the minimum residual link capacity for each of the plurality of paths at a given offset satellite-fixed cell l is defined by $r_p(l)=c_i(l)-R_p$, where $c_i(l)$ is the current link capacity of a given link i at offset satellite-fixed cell l, and where $R_p$ represents the bandwidth required for a new call on path p if the connection is admitted in the offset satellite-fixed cell l, and where $$R_p = \frac{(b + C_{tot})}{(D_{req} - d(p))},$$

where b represents the token bucket size, $C_{tst}$ represents the total rate-dependent delay experienced by a packet belonging to the call, $D_{req}$ represents the end-to-end delay requirement of each packet, and d(p) represents the end-to-end propagation delay for a chosen path p if the connection is admitted on the offset satellite-fixed cell l.

9. An apparatus for predictive QoS routing of calls within a satellite network as set forth in claim 8, wherein the step of picking a path from each set of $\{k_l\}$ paths includes the sub-steps of:

i. means for picking, for each set of paths $\{k_l\}$ for offset satellite-fixed cells l=1, . . . ,L, a path, where the combined set of picked paths over all of the offset satellite-fixed cells l=1, . . . ,L is defined as a combined set of picked paths $CS_m$, where m=1, . . . ,$k^L$;

ii. means for determining the total number of link changes $H_{Sm}$ required on the combined set of picked paths CS;

iii. means for operating the means of i and ii for each different combination of paths;

iv. means for determining an overall reward for each combination set $S_m=\{p_1(i_1), p_2(i_2), \ldots, p_L(i_L)\}$, where $i_1=1, \ldots$, k is the path chosen for offset satellite-fixed cell l, by:

$$reward(S_m) = \sum_{l=1}^{L} r_p(l) - W \cdot H_{Sm},$$

where W is a constant used to weigh the relative importance of having few link changes on the route for the call as offset calls are transitioned, with respect to the balancing of the user traffic;

v. means for choosing the $S_m$ that maximizes the reward ($S_m$); and vi. means for reserving the necessary bandwidth for each path to satisfy the QoS requirements along the links forming the paths, after a path for every offset satellite-fixed cell l=1, 2, . . . , L has been determined for the connection.

10. An apparatus for predictive QoS routing of calls within a satellite constellation orbiting the earth, said satellite constellation including at least one orbit, with each one of the at least one orbit including a plurality S of satellites, each indexed by a number s, and communicatively connected by a plurality of communication links, with each particular satellite having a satellite-fixed cell divided, perpendicularly with respect to the orbit of the particular satellite, into a plurality L of satellite-fixed cell slots, with the movement of the plurality S of satellites over the each being characterized in that the satellite-fixed cell for a satellite indexed at s covers the same area as the satellite-fixed cell of a satellite indexed at s+1 after passing over an area on the earth equivalent to the area of L satellite-fixed cell slots, and with an offset satellite-fixed cell being defined each time the satellite-fixed cell covers the area of one of L satellite-fixed cell slots while moving between the position of the satellite-fixed cell corresponding to a satellite indexed s and the satellite-fixed cell corresponding to a satellite indexed s+1, providing L offset satellite-fixed cells with the L offset satellite-fixed cells for each particular satellite being indexed by a number l=1, ..., L, with the satellite-fixed cells and the offset satellite-fixed cells being defined as reference satellite-fixed cells, said apparatus including:

a. means for receiving a call from a source user to a destination user;

b. means for acquiring information for the source user and the destination user, including a user address and user location;

c. means for determining the satellite, the satellite-fixed cell, and the satellite-fixed cell slot within the satellite-fixed cell in which the source user is located, said satellite being defined as the source user end-reference satellite;

d. means for determining the satellite, the satellite-fixed cell, and the satellite-fixed cell slot within the satellite-fixed cell in which the destination user is located, said satellite being defined as the destination user end-reference satellite;

e. means for determining all paths including at most a predetermined number J of inter-satellite hops, between the source user end-reference satellite and the destination end-user reference satellite;

f. means for calculating the minimum residual link capacity for each of the paths determined by the means of (e);

g. means for determining, for each offset satellite-fixed cell l=1, ..., L, a set $\{k_l\}$ of paths that maximize the residual bandwidth at that offset satellite-fixed cell; and h. means for picking, from each set $\{k_l\}$ of paths determined for each offset satellite-fixed cell, one path p such that the combined set CS of paths for all of the offset satellite-fixed cells minimizes the number of communication link changes necessary to maintain a call between the source user and the end user.

11. An apparatus for predictive QoS routing of calls within a satellite network as set forth in claim 10, wherein the calculation of the minimum residual link capacity for each of the plurality of paths at a given offset satellite-fixed cell l is defined by $r_p(l)=c_i(l)-R_p$, where $c_i(l)$ is the current link capacity of a given link i at offset satellite-fixed cell l, and where $R_p$ represents the bandwidth required for a new call on path p if the connection is admitted in the offset satellite-fixed cell l, and where $$R_p = \frac{(b + C_{tot})}{(D_{req} - d(p))},$$

where b represents the token bucket size, $C_{tot}$ represents the total rate-dependent delay experienced by a packet belonging to the call, $D_{req}$ represents the end-to-end delay requirement of each packet, and d(p) represents the end-to-end propagation delay for a chosen path p if the connection is admitted on the offset satellite-fixed cell l.

12. An apparatus for predictive QoS routing of calls within a satellite network as set forth in claim 11, wherein the step of picking a path from each set of $\{k_l\}$ paths includes the sub-steps of:

i. means for picking, for each set of paths $\{k_l\}$ for offset satellite-fixed cells l=1, ..., L, a path, where the combined set of picked paths over all of the offset satellite-fixed cells l=1, ..., L is defined as a combined set of picked paths $CS_m$, where m=1, ..., $k^L$;

ii. means for determining the total number of link changes $H_{Sm}$ required on the combined set of picked paths CS;

iii. means for operating the means of i and ii for each different combination of paths;

iv. means for determining an overall reward for each combination set $S_m=\{p_1(i_1), p_2(i_2), ..., p_L(i_L)\}$, where i=1, ..., k is the path chosen for offset satellite-fixed cell l, by:

$$reward(S_m) = \sum_{l=1}^{L} r_p(l) - W \cdot H_{Sm},$$

where W is a constant used to weigh the relative importance of having few link changes on the route for the call as offset calls are transitioned, with respect to the balancing of the user traffic;

v. means for choosing the $S_m$ that maximizes the reward $(S_m)$; and vi. means for reserving the necessary bandwidth for each path to satisfy the QoS requirements along the links forming the paths, after a path for every offset satellite-fixed cell l=1, 2, ..., L has been determined for the connection.

* * * * *

UNITED STATES PATENT AND TRADEMARK OFFICE
CERTIFICATE OF CORRECTION

PATENT NO. : 6,609,002 B1  Page 1 of 2
APPLICATION NO. : 09/541740
DATED : August 19, 2003
INVENTOR(S) : Srikanth Krishnamurthy, Ozgur Ercetin and Son Dao It is certified that error appears in the above-identified patent and that said Letters Patent is hereby corrected as shown below:

In the drawings, Sheet 7, Fig. 7, replace the reference numeral "720" with --716-- and replace the reference numeral "716" with --720--. As shown in the attached.

Column 6, line 56, the formula reading "$Sm = \{P_1(i_1), p_2(i_2), ..., p_L(i_L)\}$" should read --$Sm = \{p_1(i_1), p_2(i_2), ..., p_L(i_L)\}$--.

Column 10, line 38, the formula reading "$A_i(t)=A_{+1}(t+T_s)$" should read --$A_i(t)=A_{i+1}(t+T_s)$--.

Column 14, line 54, cancel the text "t" and replace with --It--.

Column 16, line 20, the formula reading "$Sm = \{p_1(i_1), p_2(i_2), ...,$" should read --$Sm = \{p_1(i_1), p_2(i_2), ..., p_L(i_L)\}$--.

Signed and Sealed this

Twenty-fifth Day of March, 2008

JON W. DUDAS
*Director of the United States Patent and Trademark Office*